United States Patent [19]
Miyashita et al.

[11] Patent Number: 5,905,540
[45] Date of Patent: May 18, 1999

[54] PROJECTION-TYPE DISPLAY APPARATUS

[75] Inventors: Kiyoshi Miyashita, Suwa, Japan; Satoshi Hirashima, Torrance, Calif.; Keijiro Naito; Mamoru Kobayashi, both of Suwa, Japan

[73] Assignee: Seiko Epson Corporation, Tokyo, Japan

[21] Appl. No.: 08/708,139

[22] Filed: Aug. 27, 1996

Related U.S. Application Data

[63] Continuation-in-part of application No. PCT/JP95/02697, Dec. 26, 1995.

[30] Foreign Application Priority Data

Dec. 27, 1994 [JP] Japan .................................. 6-326499
Dec. 28, 1994 [JP] Japan .................................. 6-326809
Dec. 28, 1994 [JP] Japan .................................. 6-326810

[51] Int. Cl.$^6$ .............................. H04N 5/74; H04N 5/202
[52] U.S. Cl. ............................................ 348/674; 348/751
[58] Field of Search .................................. 348/674, 675, 348/676, 744, 751, 761, 766, 556; 345/8, 132, 98; H04N 5/74, 5/202

[56] References Cited

U.S. PATENT DOCUMENTS

| | | | |
|---|---|---|---|
| 5,103,298 | 4/1992 | Kashimura et al. . | |
| 5,122,870 | 6/1992 | Takeda et al. . | |
| 5,257,108 | 10/1993 | Muraoka | 348/674 |
| 5,282,234 | 1/1994 | Murayama et al. . | |
| 5,301,017 | 4/1994 | Murakami | 348/645 |
| 5,315,378 | 5/1994 | Satou et al. . | |
| 5,483,256 | 1/1996 | Ohi | 348/674 |
| 5,488,389 | 1/1996 | Nakanishi et al. | 348/458 |
| 5,657,034 | 8/1997 | Yamazaki | 348/556 |
| 5,764,216 | 6/1998 | Tanaka et al. | 348/674 |

FOREIGN PATENT DOCUMENTS

| | | |
|---|---|---|
| 0 351 253 A2 | 1/1990 | European Pat. Off. . |
| 0 351 253 A3 | 1/1990 | European Pat. Off. . |
| 0 400 993 A2 | 12/1990 | European Pat. Off. . |
| 0 400 993 A3 | 12/1990 | European Pat. Off. . |
| 0 409 246 A2 | 1/1991 | European Pat. Off. . |
| 0 409 246 A3 | 1/1991 | European Pat. Off. . |
| 35 02 174 | 7/1985 | Germany . |
| 31-36594 | 6/1991 | Japan . |
| 3-196790 | 8/1991 | Japan . |
| 4-30690 | 2/1992 | Japan . |
| 40-030690 | 2/1992 | Japan . |
| 4-284795 | 10/1992 | Japan . |
| 5-127620 | 5/1993 | Japan . |
| 6-230747 | 8/1994 | Japan . |
| 6-276536 | 9/1994 | Japan . |

*Primary Examiner*—Michael Lee
*Attorney, Agent, or Firm*—Mark P. Watson

[57] ABSTRACT

A projection-type video display in which the entire input video signal is first digitally corrected through digital gamma correction. Then, a subset of the corrected video signal is corrected again through analogue correction techniques. In particular this portion of the digitally corrected video signal corresponds to the subject where slopes of applied voltage-transmissivity characteristic curve (V-T curve) of liquid crystal changes relatively rapidly. The result is a more accurate gamma correction which is also less expensive than conventional, purely digital gamma correction systems. Another feature is the inclusion of three liquid crystal light valves, each having have a plurality of pixels arranged in the matrix and identical shift registers in such a way that pixels of one scanning line are driven selectively and sequentially from the same horizontal direction according to a given set of video signals, a memory where at least video signals for pixels of one scanning line are written and stored, a first drive controller for outputting video signals of one scanning line from memory in the order in which the video signals were written and supplying the video signals to pixels of a scanning line in at least one of light valves, and a second drive controller for outputting video signals of one scanning line from memory in a reverse order in which video signals were written thereto for supplying another light valve. Also disclosed is recognition unit for recognizing different types of input video signal format systems and a write controller for controlling the way of writing input video signals of each scanning line into pixels of horizontal scanning lines in the light valves based on different type of input video signal format system.

14 Claims, 19 Drawing Sheets

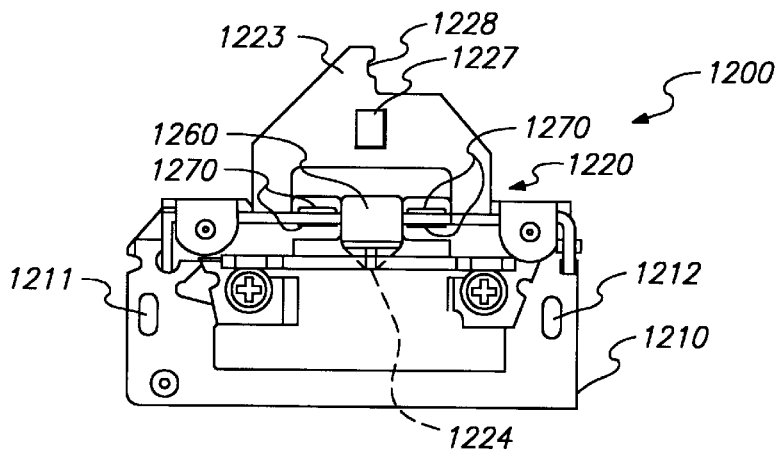
FIG.-5A
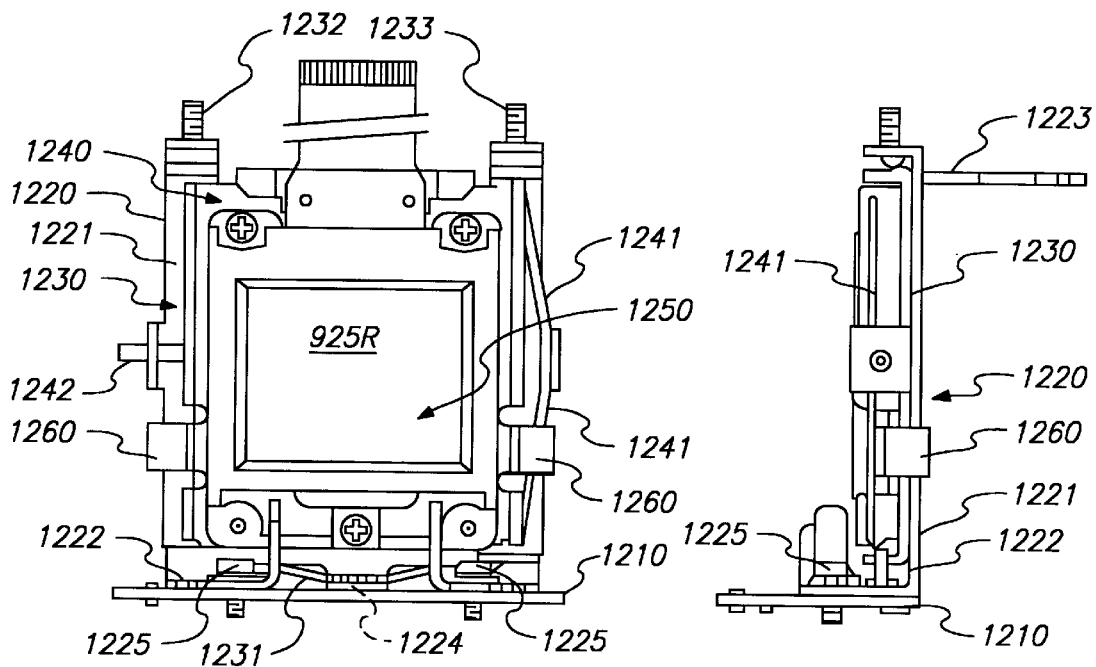
FIG.-5B  FIG.-5C

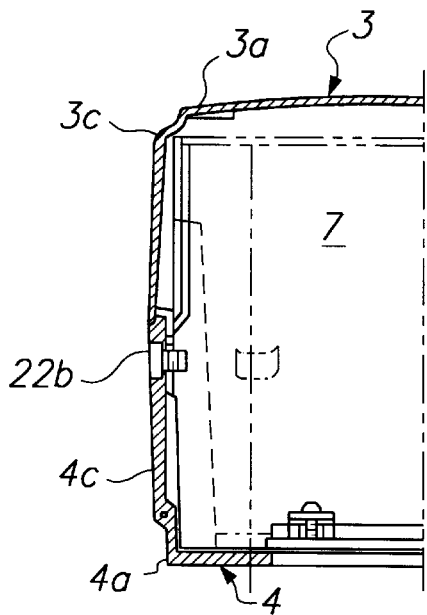
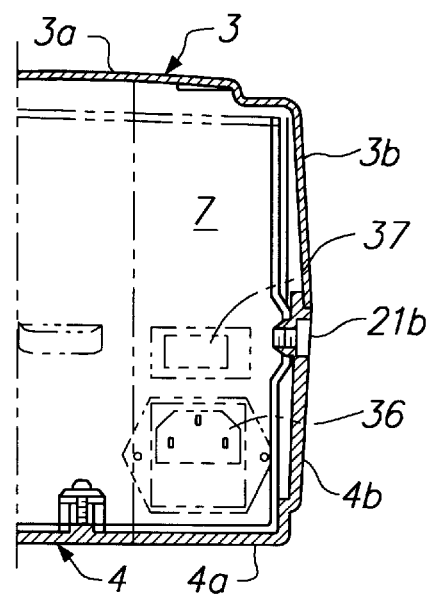
FIG.-16A    FIG.-16B
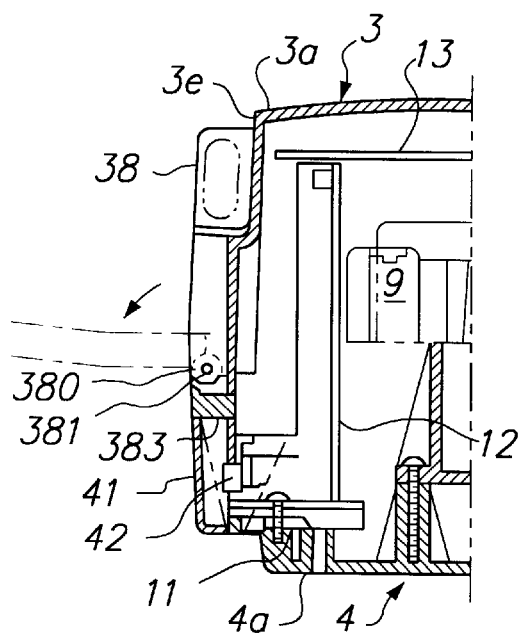
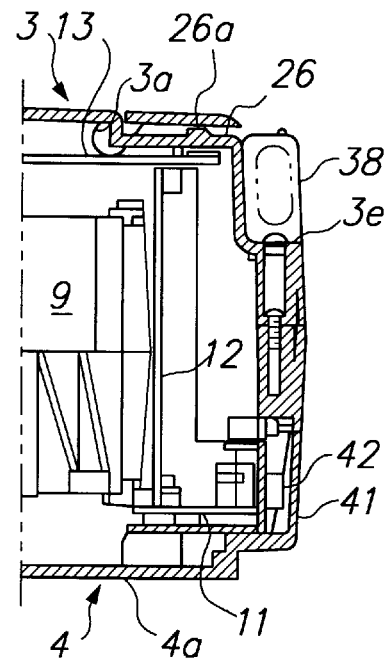
FIG.-17A    FIG.-17B

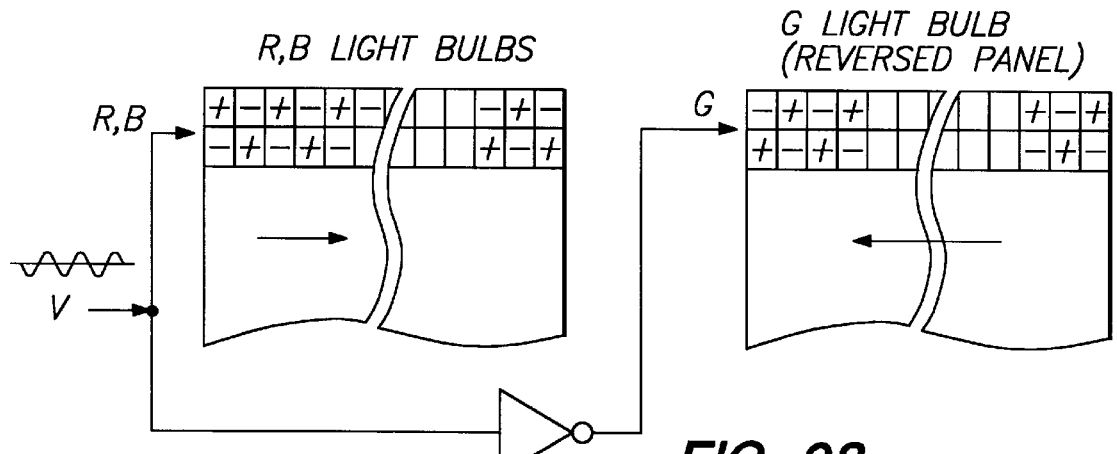
FIG.-28
(PRIOR ART)
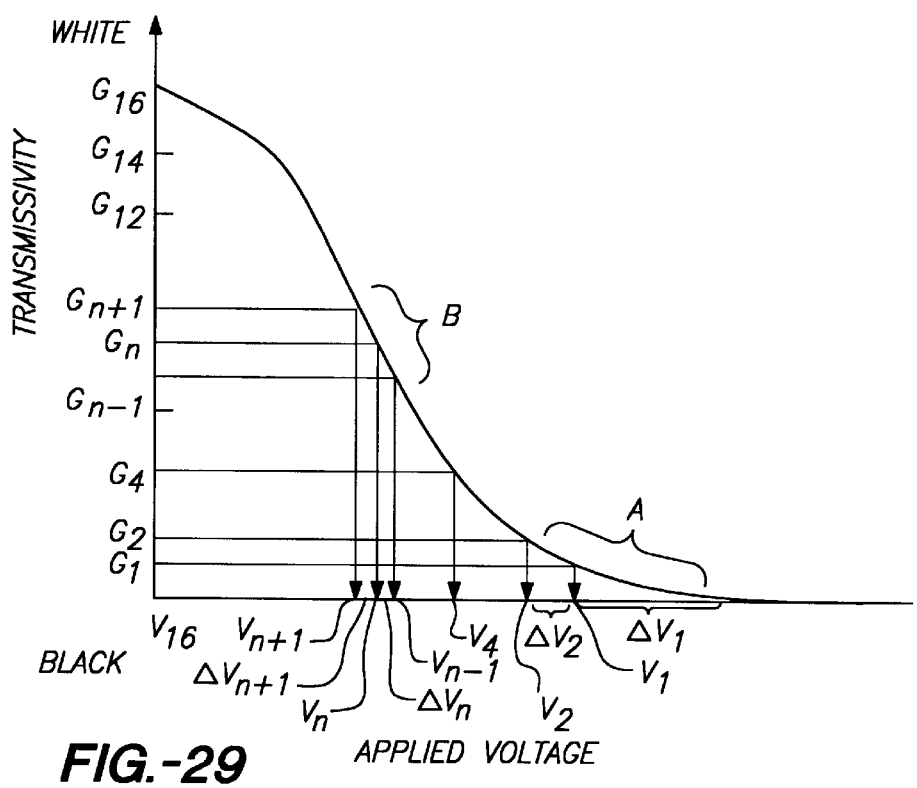
FIG.-29
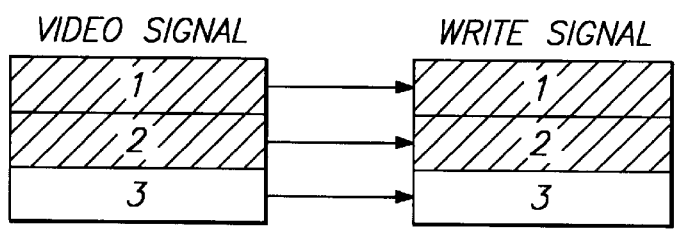
FIG.-30A FULL-LINE DRIVING

PROJECTION-TYPE DISPLAY APPARATUS

RELATED APPLICATIONS

This application is a continuation-in-part of PCT international application PCT/JP95/02697, filed Dec. 26, 1995, designating the United States. This application is also related to U.S. application Ser. No.08/697,707, now U.S. Pat. No. 5,743,610 entitled "Projection-Type Display Apparatus", Attorney's docket No. P2237b, filed on the same day as the present application and commonly assigned herewith to the Seiko Epson Corporation of Tokyo, Japan

BACKGROUND OF THE INVENTION

1. Field of Invention

This invention relates to a projection-type display apparatus enlarging and projecting color light image onto a screen through a projection lens by decomposing the white light beam from a light source into three-color light beams of red, blue, and green, modulating these colored light beams through a light valves comprising liquid crystal panels according to given video information and recombining the modulated light beams of different colors after modulation. More specifically, the present invention relates to control driving liquid crystal light valves for such a projection-type display apparatus, or the gamma correction of input video signals that are supplied to the liquid crystal light valves.

2. Description of the Related Art

Fundamentally, a projection-type display apparatus comprises a light source, a color separator segregating white light beam emitted from a light source into three primary color light beams, three liquid crystal light valves modulating three color light beams, a light synthesizer synthesizing modulated color light beams and a projection lens enlarging and projecting synthesized, modulated light beam onto a screen.

(a) In general, the three liquid crystal light valves are matrix-type liquid crystal panels having a plural of pixels arranged in the matrix. The characteristic curve of transmissivity and applied voltage for a liquid crystal panel is irregular compared to the characteristic curve showing the relationship between the brightness and the applied voltage of a CRT. Therefore, it is necessary to apply a specific gamma correction to the input video signals, in order to obtain a appropriate projection image for a liquid crystal panel based on input video signals.

There are two types of gamma correction: the analog gamma correction in which input video signals is corrected corresponding to a preset gamma correction curve; and the digital gamma correction in which input video signal corrections are made based upon digital data of gamma correction pre-stored in ROM or other devices.

The former method, the analog gamma correction, in which corrections are applied according to an approximation curve, offers a more cost effective solution compared to the digital gamma correction. The drawback, however, is a lack of detailed correction capacity afforded by digital type gamma correction.

On the other hand, the digital gamma correction is well suited for implementing highly accurate corrections because of its ability to accommodate fine, multi-steps correction values. The drawback, however, is that it requires a large number of pre set correction values in curve-value ranges, thereby requiring significant memory overhead and processing throughput.

FIG. 29 shows the relationship between transmissivity of liquid crystal and applied voltage equivalent to level of video signal. Transmissivity from 0% to 100% are divided into 16 levels of gray scale. Voltage levels of video signal correspond to these gray scale levels. Voltage differences for generating each gray scale levels in the area B are substantially equal. On the other hand, voltage differences for generating each gray scale in the area A are sharply changed because of the uniqueness of the V-T (voltage transmissivity) curve.

Even under this circumstance, as an initial step, conventional digital gamma correction is applied to all range of applied voltage. In this case, however, voltage differences in the area A need more numbers of bit allocation than the area B. Applying a digital gamma correction to the area A requires a large amount of bit allocation. For this example, if digital gamma correction is performed with 256 bits, 100 bits, 40% of them should be allocated to the area A, corresponding only to 20% of all levels of gray scale. But, if a large amount of bits are allocated only to that area, the rest of bits which should be allocated to other area should be reduced. This reduced bits allocation causes coarse correction to affect undesirable accuracy in gamma correction.

Furthermore, input video signals can be of different types of signal format systems, such as the NTSC system or the PAL/SECAM system. Therefore, gamma corrections having fixed values are not capable of applying appropriate gamma corrections to input video signals of different formats.

(b) As described in Japanese laid-open application S62-145218 by the applicants of the present invention, liquid crystal is encapsulated between a transparent substrate and a counter substrate in a matrix-type liquid crystal panel for three liquid crystal light valves. Also, thin-film transistors and transparent pixel electrodes are formed in a matrix pattern on the transparent substrate. Common electrodes are formed on the counter substrate. In such a scheme, the transmissivity of the pixels is controlled by means of voltages that are selectively applied to the pixel electrodes.

As shown in FIG. 19, the white light beam emitted by white light source lamp 805 in the optical system is separated into three light beams of red, blue, and green. They enter liquid crystal light valves 925R, 925G, 925B, are modulated according to video information, and are recombined by prism unit 910, which is a color synthesis system.

Of the light beams of various colors that have passed through liquid crystal light valves 925R, 925G, and 925B, the green light beam G reaches projection lens unit 6 after passing through prism unit 910, whereas the red light beam R and the green light beam G are reflected at a right angle by the X-shaped reflecting surface of prism unit 910 before reaching projection lens unit 6.

Therefore, after passing through prism unit 910, the red light beam R and the blue light beam B that have passed through liquid crystal light valves 925R and 925B undergo a right-left optical image reversal relative to the green light beam G that has passed through liquid crystal light valve 925G.

Therefore, the conventional solution has been to ensure that the resulting optical image is oriented correctly, conventionally, while light valves 925R and 925B could be of the same structure, the remaining light valve, 925G, must be of an inverted structure in which the pixels have a reverse selection drive orientation.

Furthermore, conventional methods employ a drive voltage, for driving the liquid crystal light valves, that alternate in fixed cycles. The transmissivity of liquid crystal may change with the polarity of the applied voltage. Therefore, conventionally, as described in Japanese laid-open application S62-254124 by the applicants of the present invention, R and B liquid crystal light valves are driven in the same polarity (e.g., "positive") and the remaining G liquid crystal light valve with the inverse structure is driven in reverse polarity (e.g., "negative"), in order to smooth out the fluctuations and eliminates the problems. Thus, as shown in FIG. 28, the polarity (phase) of the alternating drive voltage for pixels in video information fields is reversed in the light valves for R and B aco light as compared to those for G light. The arrows in this Fig. show the scanning direction of driving signal for a given light valve.

Thus, as described above, a conventional projection-type display apparatus requires two different structures, namely two different shift registers of which scanning directions are reversed for the construction of three liquid crystal light valves.

(c) Further, in order to obtain a projection image that corresponds to input video signals using a matrix-type liquid crystal panel that composes three liquid crystal light valves, it is necessary to drive the liquid crystal light valves in correspondence with the input video signals. Input video signals is commonly based on the format signal system such as the NTSC system. In this system, as is well known, one frame is composed of two odd-and-even fields, such that the number of scanning lines per frame is 525. On the other hand, the PAL/SECAM system uses 625 scanning lines per frame, leaving 100 more vertical scanning lines for the NTSC system. Consequently, 100 scanning lines of video information can be lost from the video signals in case of NTSC system for liquid crystal projection display.

To avoid this problem, video signals are conventionally compressed in order to display a given image in its entirety. Specifically, a given set of video signals is culled to compress data so that the resulting image will have five-sixths the original number of video signals.

In this method, however, the conventional compression processing causes dropouts of some video signal lines. For example, as shown in FIG. 33, curved figures such as a true circle are rendered as discontinuous displays due to data compression.

OBJECTS OF THE INVENTION

In view of the above facts, the first object of the present invention is to propose a projection-type display apparatus of a relatively inexpensive constitution that is capable of applying accurate gamma corrections to input video signals. Further, the present invention proposes a projection-type display apparatus capable of applying appropriate gamma corrections according to the form of input video signals.

The second object of the present invention is to ensure that liquid crystal light valves of the same structure can be used. Further, the present invention proposes a drive mode that eliminates problems due to transmissivity fluctuations because of the polarity of alternating drive voltages when three liquid crystal light valves of the same structure are employed.

The third object of the present invention is to propose a projection-type display apparatus that is equipped with a liquid crystal light valve drive control mechanism capable of performing video signal translation data compression processing without causing problems such as discontinuous displays due to the data compression itself.

SUMMARY OF THE INVENTION

In accordance with these and related objects, according to the present invention, the entire input video signals is first digitally corrected through digital gamma correction. Then, a subset of the corrected video signal is corrected again through analogue correction techniques. In particular this portion of the digitally corrected video signal corresponds to the subject where slopes of applied voltage-transmissivity characteristic curve (V-T curve) of liquid crystal changes relatively rapidly. The result is a more accurate gamma correction which is also less expensive than conventional, purely digital gamma correction systems.

Further, in cases where liquid crystal panels are employed in which the transmissivity decreases as the applied voltage increases, clear images cannot be obtained unless accurate gamma corrections are performed in a specified gray scale range in which the transmissivity is low. In this case also, the present invention is capable of providing accurate corrections by adopting a constitution in which further analog correction techniques are applied in such a range.

According to the present invention, the particular features of the invention to attain the above mentioned first object include: A projection-type display apparatus having a light source, a color separator for separating white light beam emitted from the light source into three primary colored light beams, three liquid crystal light valves for modulating the separated colored light beams based on given input video signals, a color synthesizer for combining the modulated colored light beams and a projection lens for enlarging and projecting said synthesized, modulated light beam onto a screen, a digital gamma corrector for applying a gamma correction to all input video signals based on a relationship between transmissivity of said liquid crystal light valves and applied voltage to said liquid crystal light valves coupled with an analog gamma corrector for applying analog gamma correction to specific portion of the said digitally corrected input video signal in a specific area (i.e. where applied voltage difference per unit level of gray scale is larger than that of other areas.

Furthermore, preferably, analog gamma correction is applied to input video signals corresponding to gray scale which is located in the range of low transmissivity is more sensitive to "dark" image features than bright image features human eyesight.

Furthermore, different digital gamma correction values may be employed to afford gamma correction according to the different types of signal format of the input video signal. Therefore, appropriate gamma correction always result, unaffected by signal format of various input video signals such as NTSC and PAL/SECAM standards.

Further, according to this invention features, to attain the second object of this include: A projection-type display apparatus having a light source, a color separator for separating white light beam emitted from the light source into three primary colored light beams, three liquid crystal light valves for modulating said separated colored light beams based on given input video signals, a color synthesizer for combining said modulated colored light beams and a projection lens for enlarging and protecting said synthesized, modulated light beam onto a screen, the three liquid crystal light valves, each having have a plurality of pixels arranged in the matrix and identical shift registers in such a way that pixels of one scanning line are driven selectively and sequentially from the same horizontal direction according to a given set of video signals, a memory where at least video signals for pixels of one scanning line are written and stored, a first drive controller for outputting video signals of one scanning line from memory in the order in which the video signals were written selectively and supplying the video signals to pixels of a scanning line in at least one of light valves and a second drive controller for outputting video signals of one scanning line from memory in the reverse order in which video signals were written selectively and supplying the video signals to pixels of a scanning line in another light valve.

Further, more preferably, signal voltage for driving the three liquid crystal light valves is an alternating voltage having the same phase, since projected optical image, (especially green image on a screen) is inverted because of inversion of such image by prism and lens. Since the human eye is most sensitive to green, the brightness difference between pixels can be reduced efficiently by reversing the polarity of the green drive voltage.

Furthermore, to attain the third object described above, the present invention may include a recognition unit for recognizing different types of input video signal format system and a write controller for controlling the way of writing input video signals of each scanning line into pixels of horizontal scanning line in light valve based on different type of input video signal format system.

The write control means performs write control as following. First, if the input video signal is based on NTSC, the liquid crystal light valves are driven by half-line control. During the half-line drive for writing in one of the two fields, odd-numbered and even-numbered, that compose one video frame, the video signals of one scanning line are double-speed clocked so that video information for this one line is written into another two lines at a time in a liquid crystal valve. In the case of the other field, the video signals of the first scanning line is shifted by one scanning line in the vertical direction and the video signals of another scanning line are double-speed clocked so that video information for this one line is written into another two lines at a time in a given liquid crystal valve.

On the other hand, if the input video signal is based on the PAL/SECAM system, the liquid crystal light valves are driven by half-line control. During the half-line drive, for writing in one of the two fields, odd-numbered and even-numbered, composing a video frame, video signals of two scanning lines from the three consecutive vertical lines are double-speed clocked so that video signal information of each one line is written into two scanning lines at a time in a liquid crystal valve. But, the video signals of the remaining one line is written into one scanning line without modification. In the case of the field, input video signals of the first line toward vertical direction are shifted and written into the first line in a liquid crystal valve. Video signals of remaining lines are processed in the same way as described in first field above.

When video signals based on the PAL/SECAM standard are input, each line of video signals is written to liquid crystal light valves in patterns of two, two, and one lines. As a result, when compared to the case of the NTSC where each video signal line is written to two lines at a time, the data is compressed by a factor of five-sixths. In this way, data compression can be accomplished without culling video signal lines. Further, since line data is staggered by one vertical line each between odd- and even-numbered fields, high picture quality free of any discontinuities can be obtained on each screen.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts,

FIGS. 2A and 2B show the arrangement of the components in the interior of the apparatus shown in FIGS. 1A through 1F, in which FIG. 2A shows the planar arrangement and FIG. 2B shows the 3D arrangement;

FIGS. 3A and 3B show a partial and isolated view of the optical lens unit and the projection lens unit; in which FIG. 3A is a schematic planar configuration diagram and FIG. 3B is a schematic cross-sectional configuration diagram thereof;

FIGS. 4A and 4B show isolated views of the head unit, the prism unit, and the projection lens unit, in which FIG. 4A is a schematic planar configuration diagram and FIG. 4B is a schematic cross-sectional configuration diagram thereof;

FIGS. 5A through 5C show the light valve block, in which FIG. 5A is a planar diagram, FIG. 5B, a frontal view and FIG. 5C, a lateral view respectively thereof;

FIGS. 16A and 16B are partial cross-sectional diagrams that shows the fixed structure of the upper and lower cases;

FIGS. 17A and 17B are partial cross-sectional diagrams that show the structure of the control wheel attachment part;

FIG. 28 shows the drive voltage polarities of pixels when conventional liquid crystal light valves of different structures are used;

FIG. 29 is a graph showing the applied voltage-transmissivity characteristics of liquid crystals;

FIGS. 30A and 30B show how the process of writing RGB signals to a liquid crystal light valve is driven and controlled according to the preferred embodiment;

DESCRIPTION OF THE PREFERRED EMBODIMENT

Figure 1A:
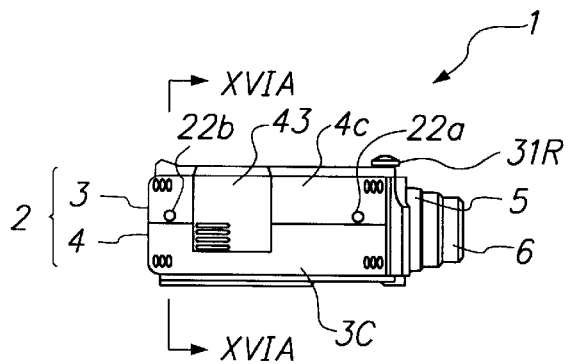
FIGS. 1A through 1F show the external outline of the projection-type display apparatus in an embodiment of the present invention.

The following is a description of the projection-type display apparatus, according to the preferred embodiment of the present invention, with reference to drawings.

(Overall Configuration)

FIGS. 1A through 1F show the physical appearance of the projection-type display apparatus of this embodiment. Projection-type display apparatus 1 of this embodiment has exterior case 2 with a rectangular solid shape. Basically, exterior case 2 comprises upper case 3, lower case 4, and front case 5 that defines the front side of the apparatus. The edge of projection lens unit 6 protrudes from the center of front case 5.

Figure 2A:
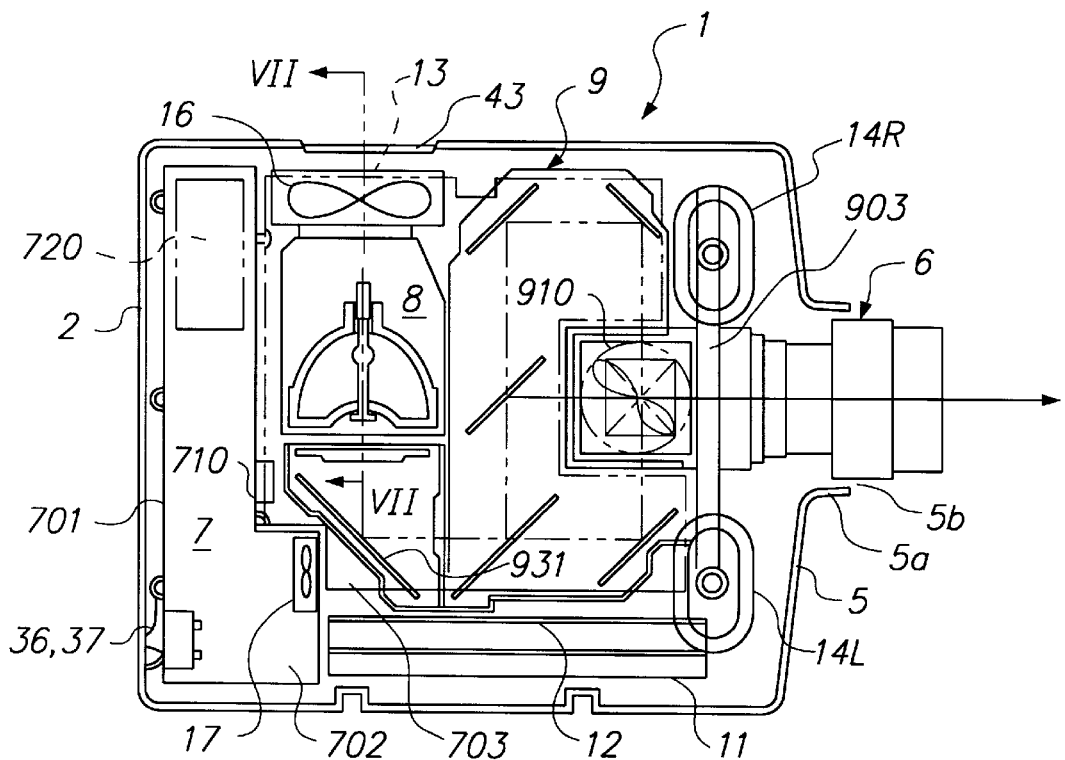
Figure 2B:
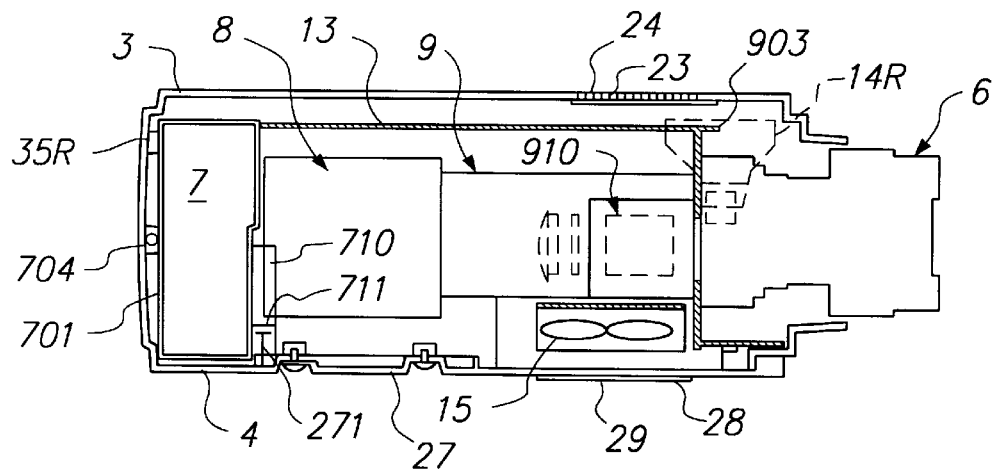
Figure 3A:
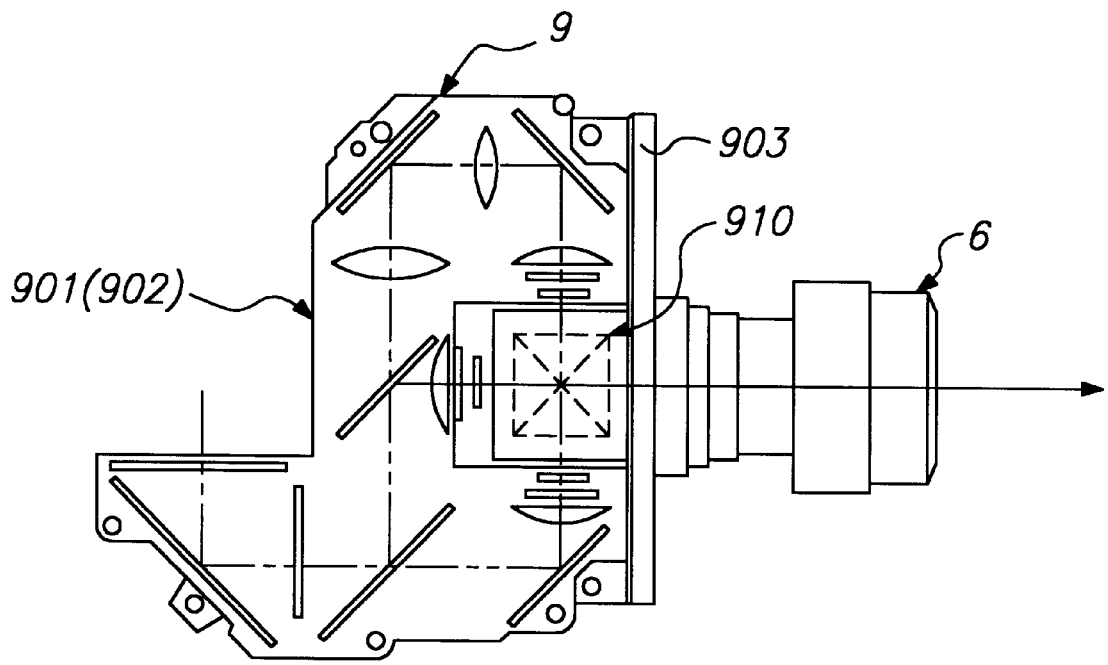
Figure 3B:
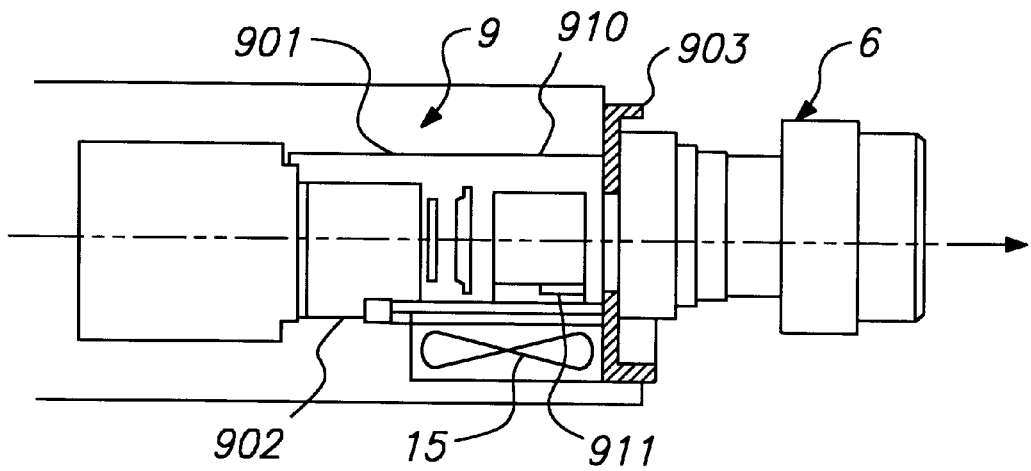

FIGS. 2A and 2B show the arrangement of the components inside exterior case 2 of projection-type display apparatus 1. As shown in the figures, light source unit 7 is located at the rear side in the interior of exterior case 2. Light source lamp unit 8 and optical lens unit 9 are provided closer to the front side of the apparatus than the light source unit is. The base edge of projection lens unit 6 is located at the center of the front side of optical lens unit 9. On the other hand, interface board 11 on which input/output interface circuits are mounted in directions anterior and posterior to the apparatus is provided on one side of optical lens unit 9. Parallel to the interface board, a video board 12, on which video signal-processing circuits are mounted, is provided. Further, a control board 13 that drives and controls the apparatus is provided above light source lamp unit 8 and optical lens unit 9. Speakers 14R and 14L are provided at the left and right corners, respectively, at the front edge of the apparatus. A cooling suction fan 15 is provided at the center of the backside of optical lens unit 9. An exhaust fan 16 is provided on the equipment side, which is the rear side of light source lamp unit 8. An auxiliary suction fan 17, which draws the cooling air current from suction fan 15 into the power supply unit, is provided at the position that faces the edge of boards 11 and 12 in the power supply unit 7.

In the projection-type display apparatus of this embodiment, the integrity and rigidity of the entire case are enhanced to improve the shock and fall resistance of the apparatus by fixing the upper and lower cases that compose the exterior case to those components among the built-in components that are especially strong.

Specifically, in this embodiment, the projection-type display apparatus has the following components: a light source lamp unit 8; a color separator which separates the white light beam emitted by the light source lamp unit into angled light beams of the three primary colors; an optical lens unit 9 that contains three liquid crystal light valves 925R, G, and B which modulate the separated colored light beams, and a light synthesizer which combines the modulated light beams of the different colors that have been modulated; a projection lens unit 6 which projects the synthesized, modulated light beam onto a screen; and a power supply unit 7. In this projection-type display apparatus equipment exterior case 2 is provided with an upper case 3 and a lower case 4 which are fitted together from the top and bottom in the direction of the thickness of the apparatus. The interior of the apparatus, which is partitioned by the upper and lower cases, contains aforementioned power supply unit 7 on the rear edge side of the apparatus. A head plate is provided on the front edge side of the apparatus. Plate prism unit 910, which is the color synthesizer for aforementioned optical lens unit 9, and the base edge of aforementioned projection lens unit 6, are fixed to the head plate. The equipment rear sides of aforementioned upper case 3 and lower case 4 are fixed to aforementioned power supply unit 7. The equipment front sides of these cases are fixed to aforementioned head plate 903.

Thus, the interlinking of upper case 3 and lower case 4 through highly rigid components at the edges in front of and at the back of the apparatus enhances the rigidity of the case as a whole and results in improved fall resistance and shock resistance.

Further, in the projection-type display apparatus of the present embodiment, projection lens unlit 6 and prism unit 910, that composes the color synthesizer for optical lens unit 9, are aligned along the optical axis direction across head plate 903 which is a highly rigid component; and these components are fixed to head plate 903. In this manner the integrity of the components is enhanced.

Because of this fact, there is little likelihood of these components getting misaligned even if the apparatus is subjected to shocks when it is dropped.

Further, in the projection-type display apparatus of the present embodiment, the heaviest components, projection lens unit 6 and power supply unit 7, are laid out appropriately so that the center of gravity of the apparatus coincides as much as possible with the geometric center of the apparatus. In other words, since, as a general rule, projection lens unit 6 is located on the front side of the apparatus, power supply unit 7 is provided on the rear side of the apparatus. In this manner, the center of gravity of the apparatus is made to coincide substantially with the front-end direction center of the apparatus. Alternatively, if projection lens unit 6 is provided either on the right or on the left, power supply unit 7 is located on the opposite side to counterbalance it.

Thus, if the equipment is accidentally dropped while being carried, it falls mainly in a horizontal position, a position in which the equipment is normally carried. In contrast to the case where the center of gravity is tilted to the front, back, right, or left, the equipment thus configured will avoid damage that might otherwise result if the equipment were dropped, and its front, rear, right, or left corner hit the floor first, and thus sustained the major impact.

In the projection-type display apparatus of the present embodiment, said heavy power supply unit 7 is fixed to one side of upper case 3 and lower case 4, and is also fixed to at least one side of said upper case 3 and lower case 4 in the direction of the thickness of the equipment at the height corresponding to the center of gravity of power supply unit 7.

In this manner, even when subjected to an external impact, the apparatus does not swing laterally, thus achieving improved shock resistance.

(Structure of the Exterior Case)

As shown in FIGS. 1A through 1F, the upper portion 3 of exterior case 2 comprises a rectangular upper wall 3a; right and left side walls 3b and 3c that extend virtually vertically downward from the three sides, except for the front side; and a back wall 3d. Similarly, lower case 4 comprises a rectangular bottom wall 4a; right and left side walls 4b and 4c that extend virtually vertically upward from the three sides, except for the front side; and a back wall 4d. The central portion of front case 5 is convexly curved slightly forward. Round opening 5b, around which a ring-shaped rim 5a is formed, opens at the center of the front case. The forward edge of projection lens unit 6 extends through the opening to the front of the equipment. Upper case 3 and lower case 4 are interlinked by locking screws 21a, 21b, 22a, and 22b at two locations, each on the right and left sidewalls (first FIG. 6A and FIG. 16B). Front case 5 is held from the top and bottom by upper case 3 and lower case 4.

Figure 1C:
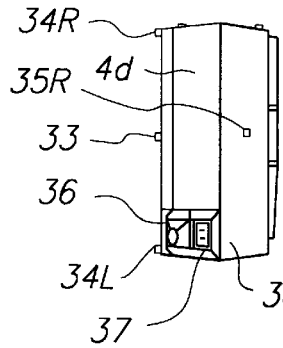
Figure 1B:
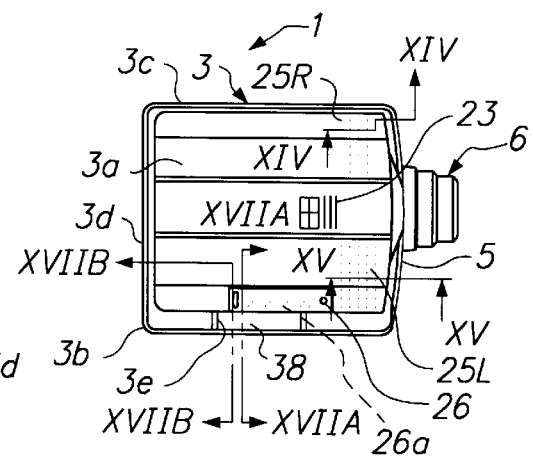
Figure 1D:
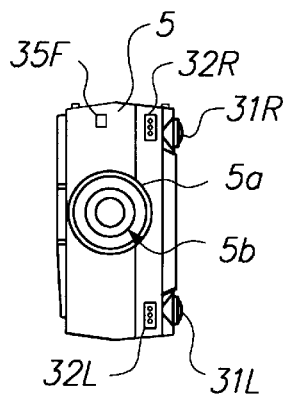
Figure 1E:
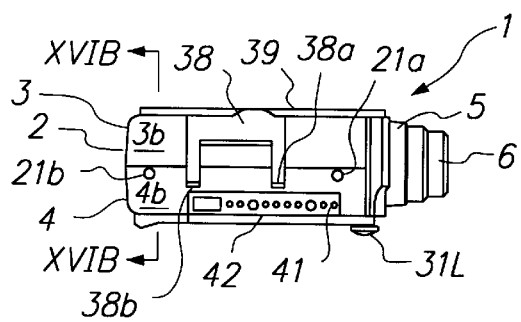
Figure 1F:
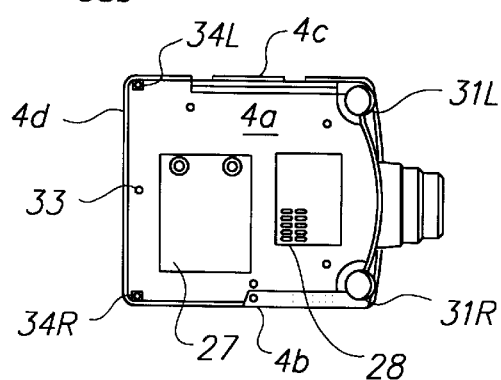

Air filter cover 23 is attached to the upper wall 3a of upper case 3 at the center forward position. A large number of ventilation holes are formed on cover 23. Air filter 24 is attached to the inside of the cover to prevent the intrusion of dust particles from the outside (FIG. 2B). Many communicating holes 25R and 25L are formed on the right and left edges on the forward side of upper wall 3a at positions corresponding to built-in speakers 14R and 14L. Operator switch cover 26 is attached to the left edge of upper wall 3a. Operator switch cover 26, with one of the edges acting as the pivot, can be opened and closed, as shown in FIG. 1C. Opening cover 26 exposes many operator switches 26a that are provided inside the cover (FIG. 27B).

Lamp exchange cover 27 is attached to the bottom wall 4a of lower case 4 at the position corresponding to light source lamp unit 8. The exchange cover 27 is screwed onto lower wall 4a. By loosening the screw and removing cover 27, one can replace light source lamp unit 8. Ventilation hole 28 is formed at a position anterior to exchange cover 27. Ventilation hole 28 is formed at the position corresponding to built-in, cooling suction fan 15. Air filter 29 (FIG. 2B) is also attached to the backside of ventilation hole 28 in order to prevent the incursion of dust particles to the inside from here.

Height adjustment feet 31 (31R and 31L) are provided at the right and left corners of the front edge of bottom wall 4a. By rotating foot 31, one can micro-adjust the height. By operating height adjustment buttons 32 (32R and 32L) that protrude toward the lower side portions of the two edges of front case 5, one can perform gross adjustments of the height of feet 31. Protrusion 33 is formed at the center of the rear edge of bottom wall 4a. Apparatus 1 is set on a table, supported at three points by process 33 and the two feet 31 described above. If the surface on which the apparatus is set has surface irregularities, auxiliary processes 34R and 34L are also formed on the two edges of the rear side of the bottom wall so that the apparatus will not rattle.

On the other hand, skylights 35F and 35R, respectively, are provided at the upper right position of front case 5 that defines the front side of the equipment and at the center of rear wall 3d of upper case 3 that defines the top half of the rear side of the equipment. These skylights receive the controlling light rays from the remote controller. Thus, in this embodiment, skylights are formed both in front and at the rear of the equipment, thus permitting one to perform remote control on the equipment from either the front or the rear side of it.

AC inlet 36 for supplying external power and main power supply switch 37 are provided on the left of rear wall 4d of lower case 4 that defines the lower half portion of the rear side of the equipment.

Carrying handle 38 is provided on the left side of the equipment. The base edges 38a and 38b of handle 38 are attached in a rotatable manner at the alignment surfaces of side walls 3b and 4b of lower case 4. Handle receptacle recess 3e is formed on side wall 3b on the upper case side so that handle 38 can be fitted in the recess. LED display 39 that displays the operating status of the equipment is provided at the upper edge of side wall 3b. Input/output terminal cover 41, which can be opened and closed and is hinged on the lower edge of the cover serving as the center, is provided on side wall 4b on the lower case side. Opening the cover exposes the many input/output terminals 42 that are located inside the cover (FIG. 17A).

Exhaust hole 43 is formed on side walls 3c and 4c of the upper and lower cases that define the opposite sides of the equipment, such that the hole extends from one side wall to the other. Cooling exhaust fan 16 is located on the rear side of exhaust hole 43 though an air filter.

(Light Source Lamp Unit)

Figure 7:
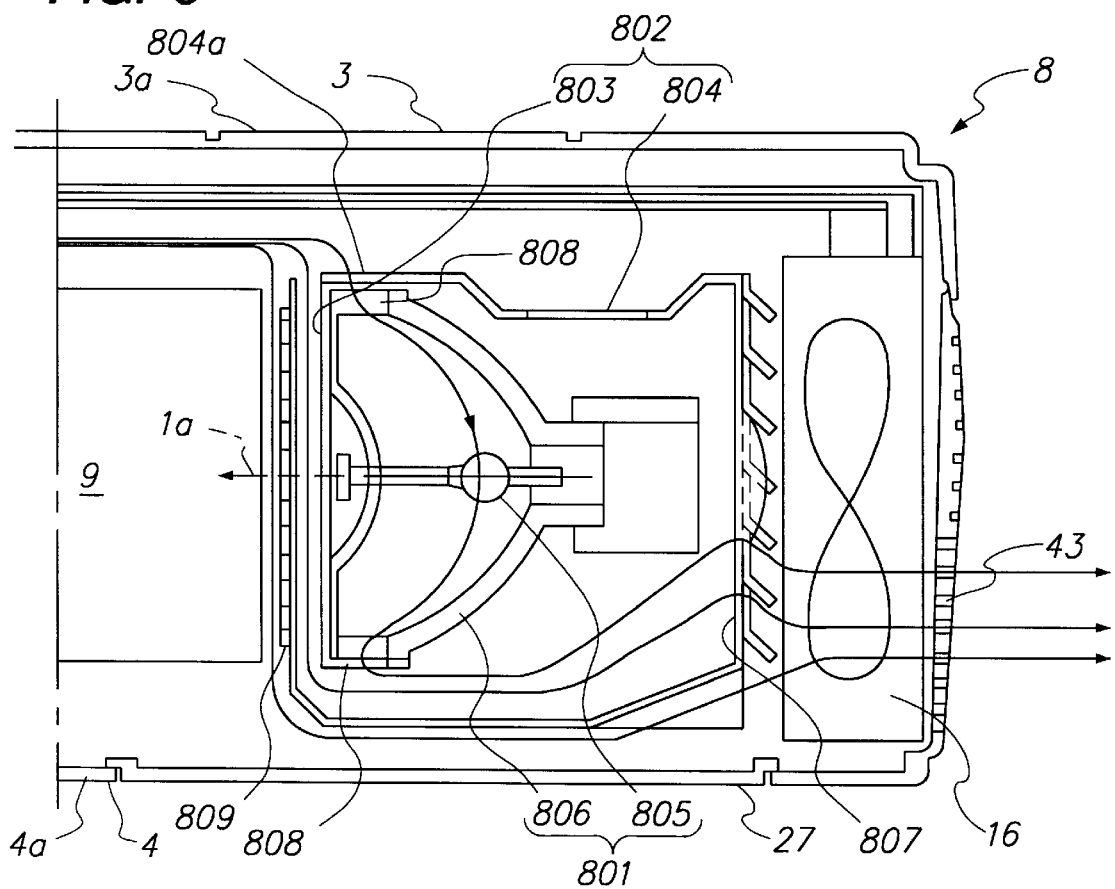
FIG. 7 is a schematic cross-sectional configuration diagram showing the configuration of the light source head lamp.

The following describes light source lamp unit 8 with reference to FIGS. 2A and 7.

Light source lamp unit 8 comprises light source lamp 801 and an approximately rectangular, solid lamp housing unit 802 that houses the light source lamp. In this embodiment lamp housing 802 has a double structure composed of inner housing 803 and after housing 804. Light source lamp 801 comprises a lamp 805, such as a halogen lamp, and a reflector 806. The light rays from lamp 805 are emitted toward optical lens unit 9 along light axis 1a.

In after housing 804, the front side, in the direction of light axis 1a, is an opening at which UV filter 809 is attached. In the direction of light axis 1a, a large number of slits 807 through which the cooling air passes are formed on the back side. Inner housing 803 is attached to the front surface of light source lamp 801. That part of the inner housing through which the emitted light passes is open. A large number of cooling air passage holes 808 are formed on the periphery of the inner housing. In this embodiment inner housing 803 and light source lamp 801 are formed in an integral manner. To replace the lamp, one detaches both the inner housing and the lamp as a set.

(Optical Lens Unit)

Optical lens unit 9 is constructed such that its optical devices, other than prism unit 910, that compose the color synthesizer are held from the top and bottom by upper and lower light guides 901 and 902. These upper light guide 901 and lower light guide 902 are fixed to the sides by upper case 3 and lower case 4 and locking screws. Similarly, these upper and lower light guides 901 and 902 are fixed to the sides of prism unit 910 by Rocking screws. Prism unit 910 is fixed to the back side of thick head plate 903, which is a die-cast plate, by means of locking screws. The base edge side of projection lens unit 6 is similarly fixed to the front side of head plate 90k by means of locking screws. Therefore, in this embodiment, prism unit 910 and projection lens unit 6 are fixed together as an integral body holding head plate 903 between them. Thus the two components holding rigid head plate 903 form an integral whole. Consequently, even when projection lens unit 6 receives an impact from an outside source, these components do not fall out of alignment.

(Optical System)

Figure 19:
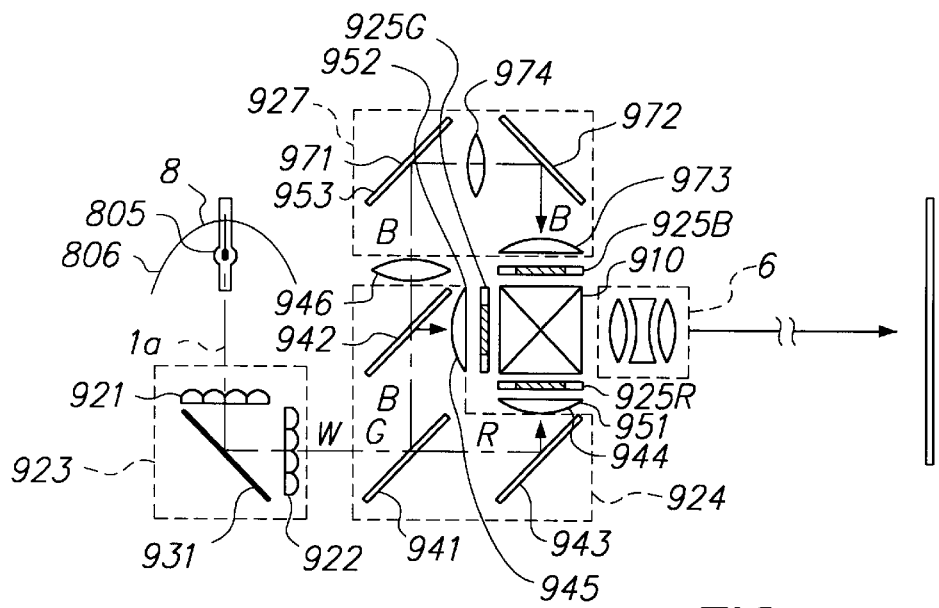
FIG. 19 is a schematic configuration diagram of the optical system that is incorporated into the apparatus shown in FIGS. 1A through 1F.
Figure 20:
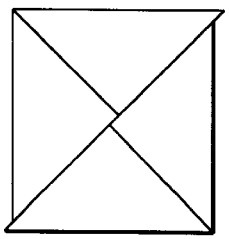
FIG. 20 shows an example of position misalignment of the prism unit.
Figure 21:
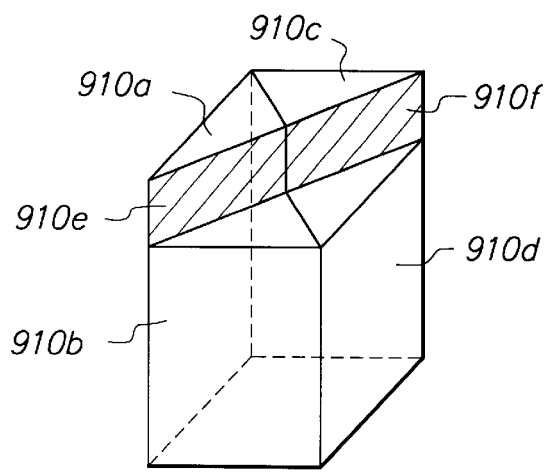
FIG. 21 depicts the conventional method for attaching a prism unit.

The following describes the built-in optical system in this embodiment. FIG. 19 shows only the optical system for projection-type display apparatus 1 of this embodiment. The optical system of this embodiment comprises the following: said light source lamp 805; illumination optical system 923 comprising integrator lenses 921 and 922 which are uniform-illumination optical devices; color separation optical system 924 which separates the white light beam W emitted by illumination optical system 923 into colored light beams R, G, and B, which are red, green, and blue; three liquid crystal light valves 925R, 925G, and 925B, which modulate the colored light beams; prism unit 910, which is a color synthesis optical system that recombines the modulated colored light beams; and projection lens unit 6 which enlarges and projects the recombined light beam onto a screen. The built-in optical system also contains a light guide system 927 which guides, blue light beam B from among the colored light beams separated by color separation optical system 924, to the corresponding liquid crystal light valve 925B.

A halogen lamp, a metal halide lamp, or a xenon lamp can be used for light source lamp 805. Uniform-illumination optical system 923 is provided with reflecting mirror 931 which bends the central optical axis 1a of the light ray emitted by the illumination optical system 90 degrees in the forward direction of the equipment. Integrator lenses 921 and 922 are provided across mirror 931 both in front and in back of the mirror at orthogonal positions.

Color separation optical system 924 comprises blue-and-green reflecting dichroic mirror 941, green-reflecting dichroic mirror 942, and reflecting mirror 943. When the white light beam W strikes blue-and-green reflecting dichroic mirror 941, first, the blue light beam B and the green light beam G contained in the white light beam are reflected 90 degrees and travel toward green-reflecting dichroic mirror 942. Second, the red light beam R passes through mirror 942, is reflected 90 degrees by rear reflecting mirror 943, and emitted by red light beam emitter 944 toward prism unit 910. Third, the blue and green light beams B and G, reflected by mirror 942, strike green-reflecting dichroic mirror 942; there, only the green light beam G is reflected 90 degrees and emitted by green light beam emitter 945 toward the color synthesis optical system. Last, the blue light beam B passing through mirror 942 is emitted by blue light beam emitter 946 toward the light guide system. In this embodiment, the distances from the white light beam emitter for the uniform-illumination optical device to emitters 944, 945, and 946 of the color light beams in color separation optical system 924 are all designed to be equal.

Condensing lenses 951, 952, and 973 are provided for different color light beams on the emission side of emitters 944, 945, and 946 in color separation optical system 924. Consequently, the light beams of different colors emitted by the emitters fall incident on these condensing lenses 951, 952, and 973 and become parallel. Of the colored light beams R, G, and B that are made parallel, the red and green light beams, R and G, fall incident upon liquid crystal light valves 925R and 925G, and are modulated. Video information corresponding to light rays of different colors is added to the incident rays. Thus, these light valves are switch-controlled by a driver (not shown in the figures) according to the supplied video information, and this process modulates the light rays of different colors that pass through the valves. Various means that are available in the public domain can be used as is for such a driver. On the other hand, the blue light beam B is guided through light guide system 927 to corresponding liquid crystal light valve 925B where the blue light beam is modulated in a similar manner according to the supplied video information. In this embodiment, polysilicon TFTs serving as switching devices can be used as light valves.

Light guide system 927 comprises an input-side reflecting mirror 971, an output-side reflecting mirror 972, an intermediate lens 974 placed between these mirrors, and a condensing lens 973 placed in the forward location of liquid crystal panel 925B. In terms of the light path lengths of light beams of various colors, the blue light beam B has the greatest distance from light source lamp 805 to a given liquid crystal panel, and, consequently, the blue light beam sustains the greatest amount of loss in luminous energy. The amount of loss in luminous energy can be reduced by providing a light guide system 927. In this manner the light path lengths for different light beams can be made substantially equal.

The light beams of different colors that have been modulated after passing through liquid crystal panels 925R, G, and B enter color synthesis optical system 910 and are recombined there. In this embodiment, the color synthesis optical system is made of prism unit 910 that is composed of a dichroic prism, as described above. The color image that is recombined by the color synthesis optical system is enlarged and projected onto a screen at a specified position through projection lens unit 6.

In the optical system of the present embodiment, a half-wavelength plate should preferably be provided in the paths of light beams of various colors in order to collimate the light beams with the S polarized light. Thus, by ensuring that only the S polarized light rays are used, even in situations where both P- and S-polarized light rays exist on a mixed basis, the extent of light separation that can be achieved using the dichroic mirror is enhanced as compared to the situation where random polarized lightrays are used without modification. Light guide system 927, which reflects light beams using a mirror, offers greater reflectivity for the S-polarized light rays than the P-polarized light rays. In this way, the optical system of the present embodiment offers the advantage of minimizing the loss of luminous energy.

Figure 34:
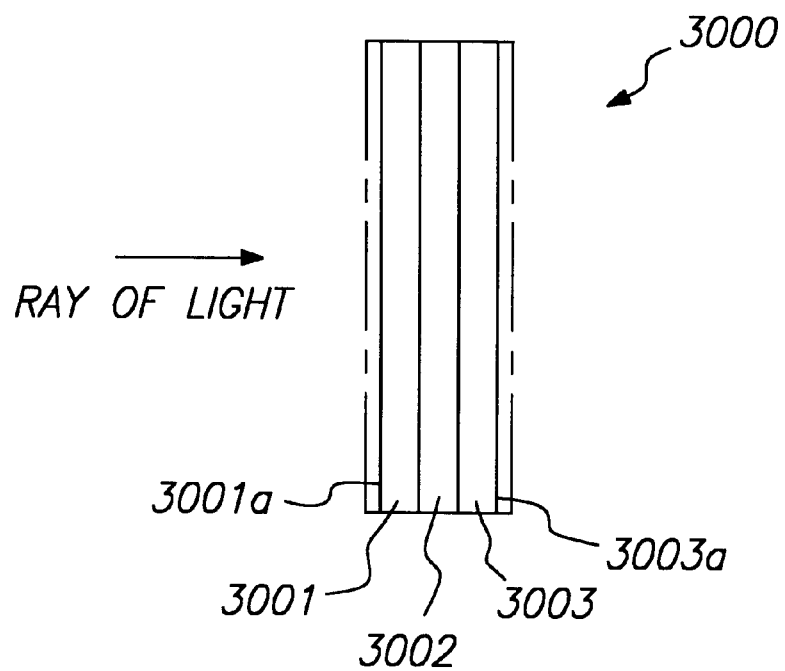
FIG. 34 shows the configuration of the half-wavelength plate of the present invention.

As shown in FIG. 34, it suffices in this case to attach a half-wavelength plate 3002 to one side of transparent glass board 3001 and use a laminated plate 3000 that has the structure where a polarizer plate 3003 is attached to the surface of the half-wavelength plate 3002. When applying this structure to the present embodiment, for embodiment, by placing the half-wavelength plate on the red and blue light paths, it suffices to provide a non-reflecting coating on surface 3001a of the glass substrate and on surface 3003a of the polarizer plate in order to enhance the transmissivity; likewise, when placing the half-wavelength plate on the green light path, it suffices to attach a green filter to surface 3001a of the glass substrate while not treating surface 3003a of the polarizer plate. It is preferable to obtain an image with an overall high CR ratio by using a polarizer plate 3003 that is high in CR ratio (degree of polarization) at the expense of brightness on the laminated plate that is placed on the green light path.

Figure 35:
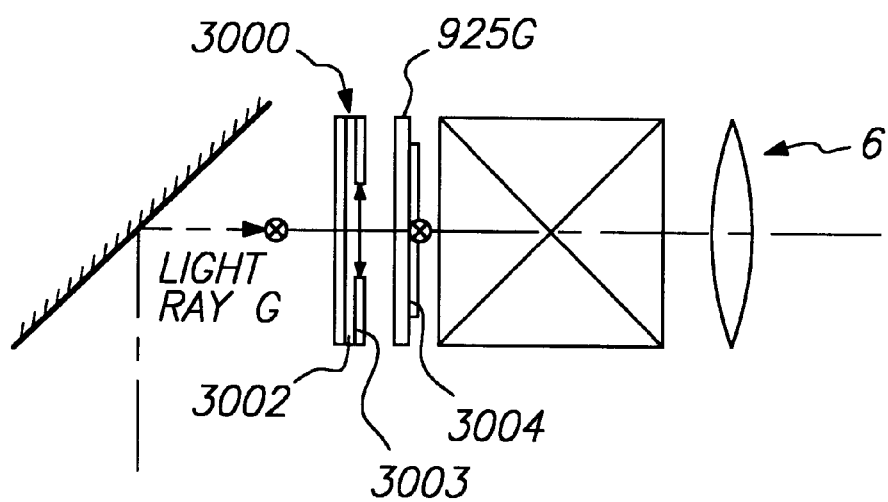
FIG. 35 is a partial configuration diagram showing a part of the optical system for a green light beam for which a half-wavelength plate of FIG. 34 is provided.

FIG. 35 shows an embodiment in which a half-wavelength plate is provided on the green light path for the optical system of the present embodiment. The figure shows a top-down view. For the enlarged, projected image, the transmission axis is the top-to-bottom direction. The transmission axis of the light beam falling incident upon the liquid crystal light valve is oriented in the top-to-bottom direction. The transmission axis of the polarizer plate 3003 that is attached to half-wavelength plate 3002 is orthogonal to that direction. The transmission axis of the polarizer plate 3004 located on the output side of liquid crystal light valve 925G is oriented in the top-to-bottom direction. Half-wavelength plate are also similarly provided on the red and blue light paths.

(Prism Unit 910)

Prism unit 910 has an angular column shape with a square cross section formed by attaching four triangle column prisms having the same refractive index. A dielectric film is formed on each attachment surface to confer the desired optical properties to the prism unit.

Figure 22:
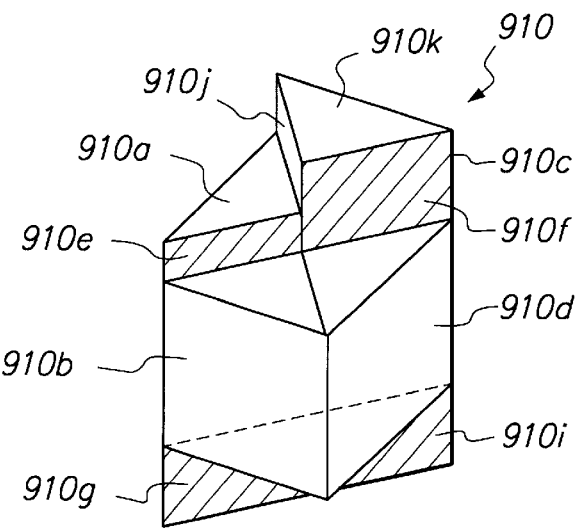
FIG. 22 depicts the method by which the prism unit is attached according to the preferred embodiment.
Figure 23:
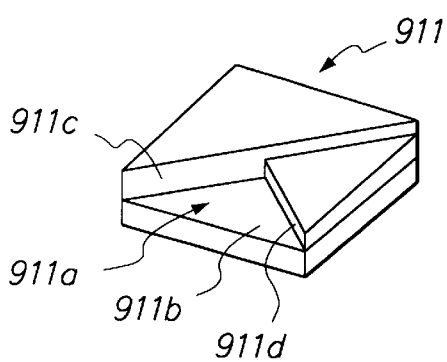
FIG. 23 depicts the shape of the prism unit fixing plate according to the preferred embodiment.

Prism unit 910 of the present embodiment is made by accurately attaching four prisms as follows: First, as shown in FIG. 22 in this embodiment, prism 910c (the first triangle prism) is the longest; prisms 910d and 910b (the third and fourth triangle prisms) are the shortest; and the remaining prism, 910c (the second triangle prism), is has an intermediate length. The longest prism 910c and the shortest prism 910d are attached to each other in such a way that a vertical step difference is created between them. Similarly, the intermediate-length prism 910a is attached to the shortest prism 910b in such a way that a vertical step difference is created between them. After that, the pairs of prisms are attached so that a step difference is created on the top edge side between the longest prism 910c and the intermediate-length prism 910a.

In prism unit 910 obtained by attaching the individual prisms, position alignment surfaces 910g and 910i are formed on the lower edge parallel to the conventional position alignment surfaces 910e and 910f (the exposed lateral surface). Further, a position alignment surface 910j (the exposed lateral surface) is formed that is orthogonal to these position alignment surfaces. Therefore, one can accurately attach the four prisms by pressing a tool against these surfaces.

Further, for prism unit 910 of the present embodiment so attached together, one can accurately position optical lens unit 9 by attaching it to the desired attachment position as described below by using the orthogonal position alignment surfaces 910f and 910j that are formed on the upper edge of prism 910c:

Specifically, in this embodiment, a prism-affixing plate 911 made of resin, of the shape shown in FIG. 22, is used. An attachment groove 911a with a right isosceles triangle shape with a depth such that the upper edge surface 910j of aforementioned prism 910c fits exactly in it is formed on the surface of affixing plate 911. The upper edge surface 911a of prism 910c is bonded and fixed to the bottom surface 911b of the groove. By pressing the position alignment surfaces 910f and 910j of prism 910c against the pair of orthogonal lateral sides, 911c and 911d, respectively, of the groove, one can accurately align the center of prism unit 910. In this way, prism unit 910 can be attached at an accurate position.

In this embodiment, prism-fixing plate 911 is fixed to the bottom wall 92 of head plate 903 by means of locking screws, and the resulting structure is such that prism unit 910 is mounted on the top side of the head plate.

(Mechanism for Preventing Optical Crosstalk)

Figure 24:
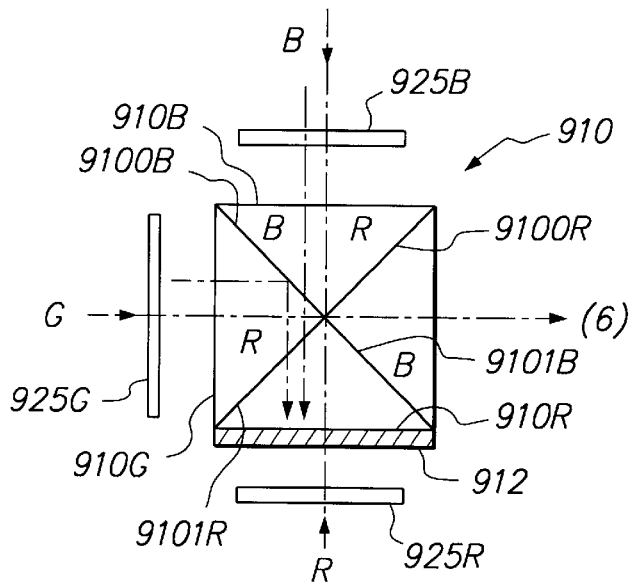
FIG. 24 shows a preferred embodiment of a prism unit.

In prism unit 910 of the present embodiment, the red light beam passes through the prism surface into which the modulated light beam that has passed through light valve 925R enters. However, it is desirable to attach glass filter 912 that absorbs and blocks the blue light beam to this prism surface. Thus, as shown in FIG. 24, glass filter 912 is attached to the incident surface 910R for the red modulated light beam for prism unit 910. The modulated light beams of different colors that have passed through light valves 925R, G, and B pass through prism unit 910; they are reflected by the X-shaped reflecting surface of the prism unit and output to the side of projection lens unit 6.

In each color, however, a small amount of light is not reflected by the reflecting surface; it passes through the reflecting surface and reaches the sides of the liquid crystal light valves that are located across prism unit 910. For embodiment, sometimes the blue modulated light beam passes through the blue reflecting surface and enters into the red light valve 925R from its back side. Conversely, sometimes the red modulated light beam passes through the red reflecting surface and enters into the blue light valve 925B from its back side. Further, the green modulated light beam, not passing through the prism unit 910, is sometimes reflected to the side of the red light valve 925R. Thus, a light ray entering a liquid crystal light valve from the back side could cause adverse effects, such as a malfunction of the liquid crystal panel. This effect is especially significant in the case of blue light rays which are short wavelength light rays.

This problem can be prevented by attaching a glass filter 912 to the incident surface 910R for the red modulated light beam for prism unit 910, as described above, so that no blue light beam will enter liquid crystal light valve 925R from the back side.

It should be noted that a filter that absorbs a red light beam can also be attached to the incident surface of the blue modulated light beam in addition to filter 912 mentioned above.

(Arrangement of a Power Supply Unit and a Base)

In the projection-type display apparatus of the present embodiment, the following measures are taken to minimize the length of equipment power supply lines and the length of supply lines for internal electrical signals, both of which are sources of noise: specifically, power supply unit 7 and the built-in power supply circuits are covered by shield case 701, and the external power supply inlet and power supply switch 37 are directly fixed to the shield case.

Further, interlock switch 710, which turns the equipment power supply unit on and off in tandem with the attachment and detachment of the lamp exchange cover 27 for replacing light source lamp 801, which is formed on the exterior equipment case, is fixed to shield case 701 of power supply unit 7.

Consequently, as in the case where these units are separate and removed from power supply unit 7, the need for a lead wire, which is normally strung around the exterior of power supply unit 7 for connecting power supply unit 7, is eliminated. As a result, such a lead wire is laid out only within power supply unit 7 and shielded by shield case 701. This permits minimizing the power supply line which is a source of noise.

Further, light source Ramp unit 8 and power supply unit 7 are located adjacent to each other.

This also minimizes the length of the lead wire for connecting these units, thus minimizing the amount of noise generated by these components.

Further, interface board 11, on which interface circuits that are provided within the equipment are mounted; video board 12, on which video signal-processing circuits are mounted; and control board 13, on which drive control circuits are mounted, are arranged as follows: first, interface board 11 and video board 12 are arranged so that parts of them at least are in close proximity to each other so that an electrical connection is formed between the boards at the adjacent position. Similarly, said video board 12 and said control board 13 are arranged so that parts of them at least are in close proximity to each other so that an electrical connection is formed between the boards at the adjacent position.

Thus, as in the case where these boards are located far from each other, the need to lay a large number of signal lines is eliminated. Thus, minimizing the length of the signal lines, which are sources of noise, suppresses noise generation.

Said interface board 11 and said video board 12 are fixed inside the equipment using a common board-fastening plate, and the circuit-fastening plate is used as a shielding plate to form a shield structure composed of said interface board 11 and video board 12.

Thus, a compact shield structure of these board components can be formed.

The following describes the specific constitution of the shield structure.

As shown in FIG. 2A, in power supply unit 7 the component devices are built into the interior of a metal shield case 701 in order to prevent any leakage to the outside of the electric and magnetic noise that is generated in the power supply unit. Shield case 701 has a size that extends from the right to the left side walls of exterior case 2 of the equipment. The left side of the shield case has a planar shape that protrudes at a fixed width toward the front part of the equipment. In other words, a reflecting mirror 931 for the uniform illumination system for optical system block 9 is provided in front of the protruding unit 702, at a 45-degree angle to the anterior-posterior direction of the equipment. The space on the back side of the protruding unit tends to be a dead space. To ensure effective utilization of space 703, in this embodiment, shield case 701 is made to protrude as far as the side of space 703, thus ensuring the availability of space for the constituent components for the power supply unit.

Shield case 701 for power supply unit 7 has a rectangular hollow cross section and generally a greater rigidity than the other components. The bottom side of case 701 is fixed to bottom 4a of lower case 4 using locking screws. Similarly, the top side of the case is fixed to top wall 3a of upper case 3 using locking screws. Thus, in this embodiment, fixing both upper case 3 and lower case 4 at the rear edge of the equipment to a highly rigid shield case 701 ensures a high degree of integrity and rigidity for the exterior case at the rear edge of the equipment.

Figure 18:
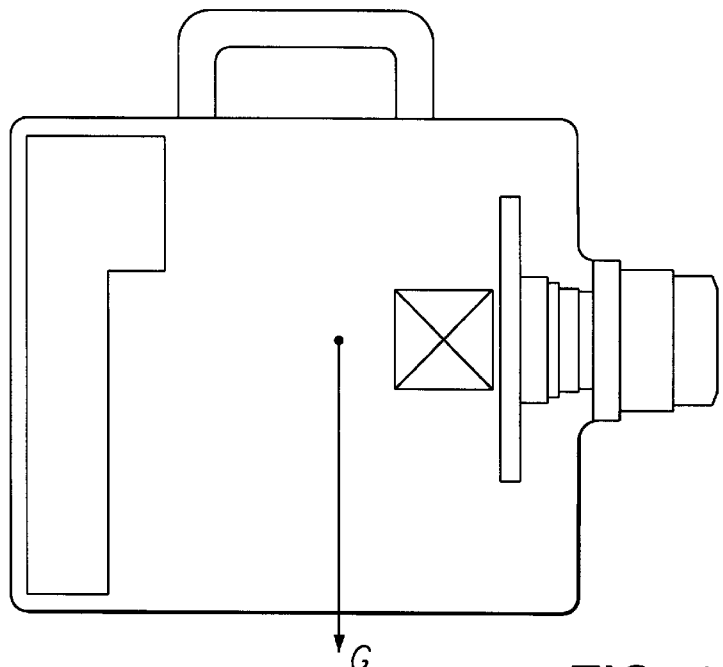
FIG. 18 indicates the center of gravity of the apparatus shown in FIGS. 1A through 1F.

It should be noted that power supply unit 7 is heavier than the other components that are provided inside the equipment. Other heavy components in the equipment, along with power supply unit 7, include prism unit 910, which is fixed at the front and back of head plate 903, and projection lens unit 6. As FIG. 2A indicates, power supply unit 7 in this embodiment is arranged sideways at the rear edge of the equipment. The constituent elements of power supply unit 7 are arranged appropriately so that their center of gravity is adjusted to occur at the center of the equipment in the width direction. On the other hand, prism unit 910 and projection lens unit 6 are located at the center of the front edge of the equipment. Consequently, in this embodiment, the center of gravity of the equipment occurs approximately at the center in both the width direction and anterior-posterior direction of the equipment. As a result, if the carrying handle 38 is drawn out and the equipment is carried in the orientation in which the left side of the equipment is turned up, as shown in FIG. 18, and if the equipment is dropped accidentally, the equipment falls in that orientation because its center of gravity is located at the center both in the right-left direction and in the anterior-posterior direction. If the center of gravity of the equipment is tilted either to the front or back or to the right or left of the equipment, the equipment will fall, tilting toward the center of gravity. When the equipment falls in this way, a corner of its exterior case will be the first to hit the floor. This exerts a locally excessive impact force, and results in a high likelihood of damage to the affected part. In this embodiment, however, since the equipment will fall "as is" without tilting either laterally or in the anterior-posterior direction, the entire right side at the bottom of the equipment hits the floor virtually simultaneously, thus substantially reducing the possibility of any local damage occurring.

Further, conventional power supply unit 7 is fixed to the side of exterior case 2 only at the top or bottom. By contrast, as illustrated in FIG. 2B, in this embodiment power supply unit 7 is fixed to the side of exterior case 2 using locking screws 704 even at the height position corresponding to the center of gravity in the vertical direction of the equipment. In this embodiment, the power supply unit is fixed to rear wall 4d of lower case 4. As a result, the back-and-forth oscillations of power supply unit 7 are effectively prevented even when back-and-forth vibrations are applied to the equipment.

On the other hand, in power supply unit 7 the power supply paths from the power supply unit to various mechanical parts are minimized, thus minimizing the need for lead wires which generate noise and suppressing the generation of noise. As an embodiment, both AC inlet 36 and main power supply switch 37 are directly fixed to the rear side of shield case 701 of power supply unit 7. This eliminates the need for lead wires that are drawn from these components to power supply unit 7. Further, interlock switch 710, that moves in tandem with the opening and closing operations on lamp exchange cover 27 attached to the rear surface of the equipment, is also attached in an integral manner to the front side of shield case 701 for power supply unit 7. As shown in FIG. 2A, interlock switch 710 is attached at the right side of the equipment at a position slightly away from the shield case process 702. The operating part 711 of switch 710 faces down and is constantly pressed upward by an action protrusion 271 that extends vertically from the top surface of exchange cover 27. In this state interlock switch 710 remains on. On the other hand, if exchange cover 27 is removed, the operating part of switch 710 shifts downward, thus changing the switch to the off state. Thus, switch 710, which is conventionally located at a distance from power supply unit 7, is fixed to the side of shield case 701 for the power supply unit, thus reducing the length of the lead wires.

Further, in power supply unit 7 of this embodiment a ballast circuit 720, which is the drive circuit for the lamp unit 8 that is located adjacent to the power supply unit at the front side of the equipment is provided on the same side as lamp unit 8, thus minimizing the length of the lead wires extending from there to lamp unit 8. Thus, in this embodiment, the power supply path drawn out from power supply unit 7 and leading to the mechanical components is shortened. This reduces the number of noise sources as compared to the conventional case, thus suppressing the generation of noise.

Figure 11:
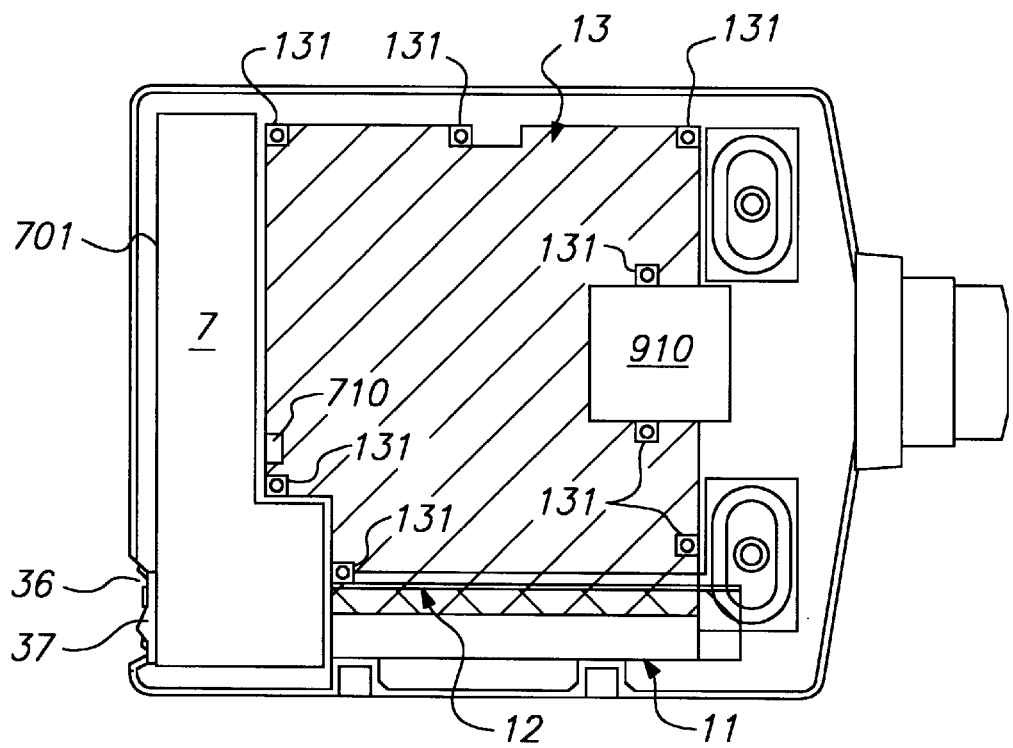
FIGS. 11–13 explains the arrangement of the circuit boards housed inside the projection apparatus.
Figure 12:
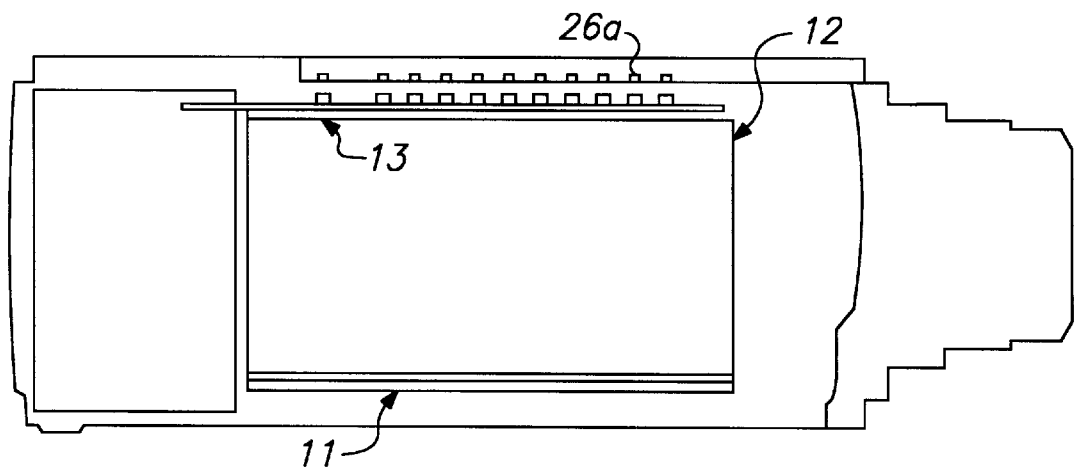
Figure 13:
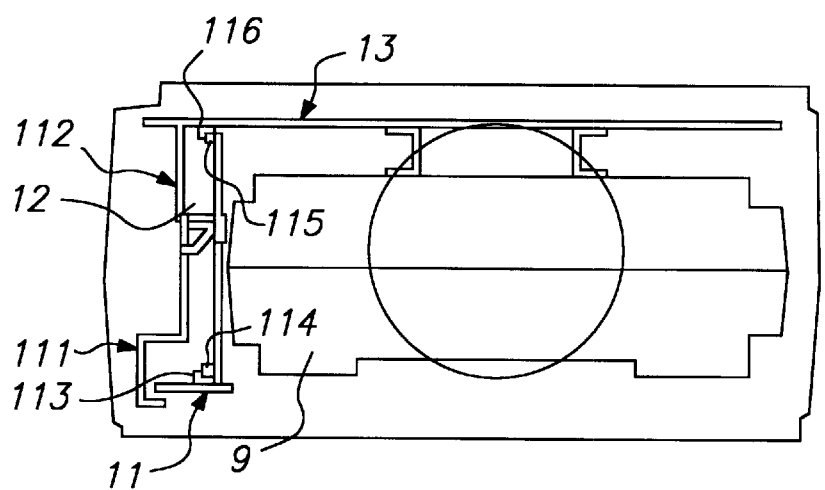

The following describes the arrangement of interface board 11, video board 12, and control board 13 with reference to FIGS. 11, 12, and 13. First, control board 13 is placed at the lower position of upper wall 3a of upper case 3 parallel to the upper wall and fixed to the side of upper case 3 at the periphery at several spots by locking screws. This board 13 has a shape that covers the top surface of optical system block 9 and light source lamp unit 8. The part directly above prism unit 910 has a shape that is cut into rectangular sub-units. The edge on the left side of the equipment of board 13 is provided with contact points that correspond to operator switches 26a that are arrayed on the left side edge of the top surface of the equipment.

As shown in FIG. 13, interface board 11 is placed in parallel to and at a position slightly higher than the bottom wall 4a of lower case 4. Video board 12 is placed parallel to the side wall on the left side of the equipment in the upright position in the vertical direction of the equipment from the surface side of interface board 11. These two boards, 11 and 12, are supported by board-locking fixture 11 that is fixed to the bottom wall 4a of lower case 4. Shielding plate 112 is attached to the top edge of board-locking fixture 111. The top edge side of shielding plate 112 extends to the top edge of video board 12. Therefore, a shielding space is partitioned and formed by and between these two boards, 11 and 12, shielding plate 112, and board-fastening fixture 111. Consequently, this prevents any leakage of noise generated by electric and electronic devices that are provided between these components.

Here, the boards are electrically connected as follows: First, connector 113 to the side of video board 12 is provided on the surface of interface board 11. On the surface of the lower edge of video board 12, a connector 114 is provided that can be plugged into connector 113. Similarly, a connector 115 to the side of control board 13 is provided on the surface of the upper edge of video board 12. A connector 116, which can be plugged into connector 115, is provided on the back side of control board 13. Therefore, as shown in FIG. 13, when boards 11, 12, and 13 are placed together, the corresponding connectors are interconnected.

Thus, in this embodiment the boards can be connected with no need for laying lead wires. This reduces the number of noise sources and thus suppresses the generation of noise.

Further, in this embodiment, as shown in FIG. 11, the corners of the periphery of control board 13 are fixed to the side of exterior case 2, i.e., the grounding side, using locking screws. These corners are liable to produce noise. However, as in this embodiment, by grounding these components it is possible to suppress the generation of noise.

(Structure of the Head Plate Component)

Figure 4A:
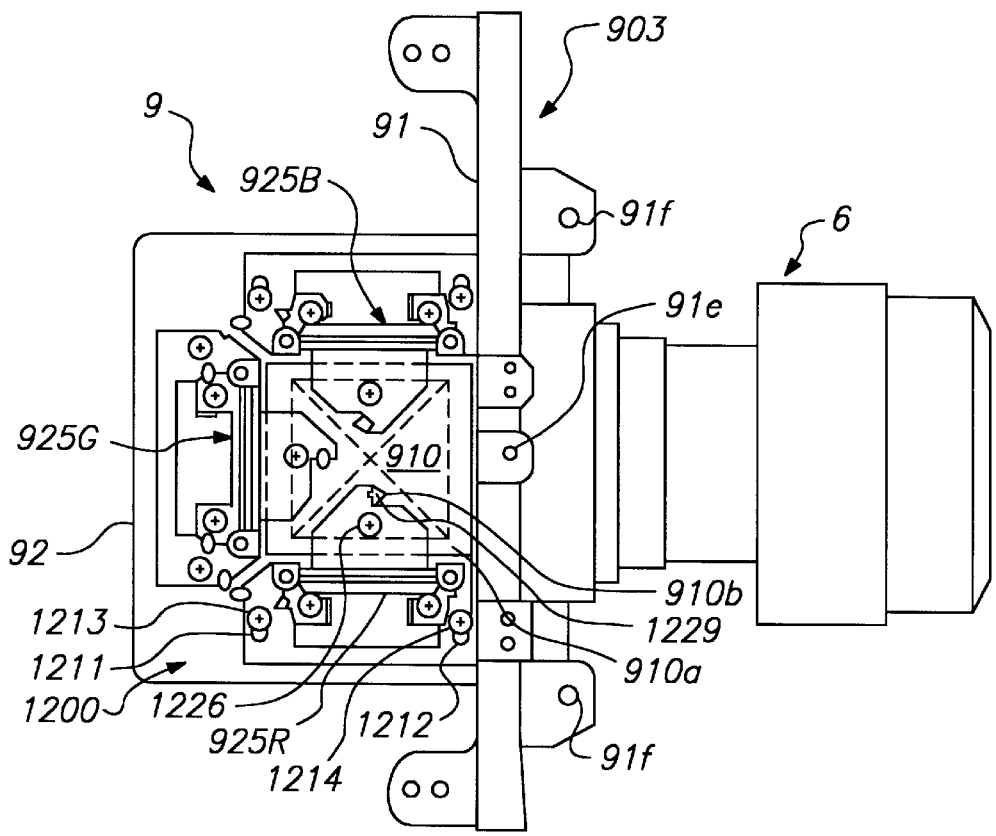
Figure 4B:
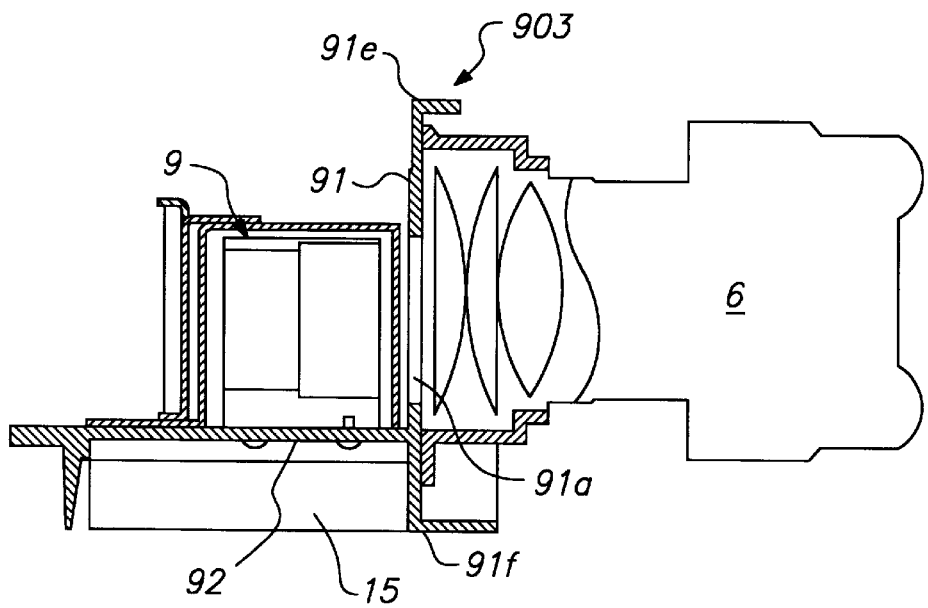
Figure 6:
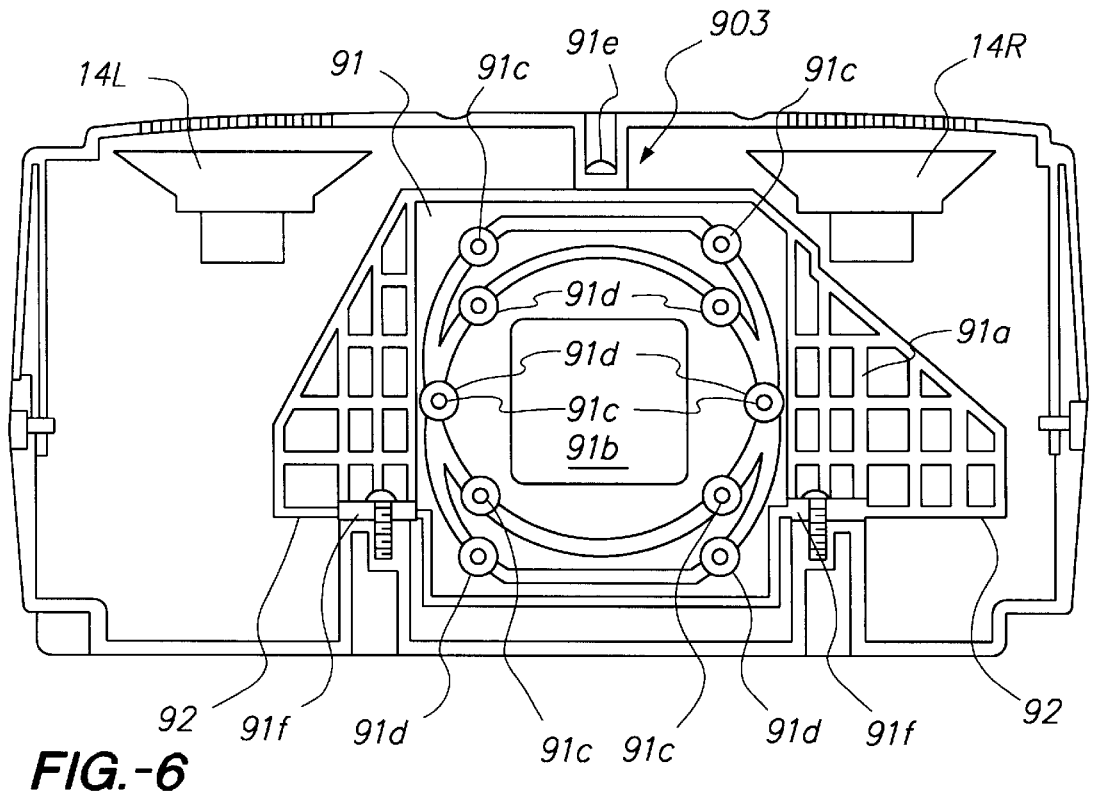
FIG. 6 is a schematic frontal diagram showing the shape of the head plate.

The following is a description of the shape of head plate 903 principally with reference to FIGS. 4A, 4B, and 6. Head plate 903 basically comprises a vertical wall 91, which extends in an upright orientation in the width direction of the equipment; and a bottom wall 92, which extends horizontally from the lower edge of vertical wall 91. As shown in FIG. 6, vertical wall 91 has a high degree of exterior-surface rigidity, in which a large number of reinforcing ribs 91a are formed vertically and horizontally on its surface. A rectangular opening 911b is formed at the center of the vertical wall to allow the passage of the light rays emitted by prism unit 910. Further, screw holes 91c for prism unit locking screws are formed on vertical wall 91. Also, screw holes 91d for fixing the board edge side of projection lens unit 6 are formed on the vertical wall. As indicated in FIG. 4B, the board edge side of projection lens unit 6 is fixed to the surface of the front side of vertical wall 91, and prism unit 910 is fixed to the surface of the rear side.

Thus, because prism unit 910 and projection lens unit 6 are fixed in condition in which they are aligned across the highly rigid vertical wall 91, the prism unit and the projection lens unit are highly integrated so that, even if subjected to impact, they are extremely unlikely to become dislodged from their relative positions.

A cooling fan 15 is attached to the back side of bottom wall 92 of head plate 903. Communication holes (not shown in the figure) are formed on bottom wall 92 to allow for the passage of cooling air.

As indicated in FIGS. 2B and 4A, attachment parts 91e and 91f for upper case 3 and lower case 4 are formed, at the upper edge and the lower edge, respectively, of vertical wall 91 of head plate 903. These parts are fixed to the sides of upper case 3 and lower case 4, respectively, by means of locking screws.

Thus, in this embodiment as described above, the rear edges of upper case 3 and lower case 4 are fixed to power supply unit 7, and the front edges are fixed to head plate 903. Because upper case 3 and lower case 4 are fixed to rigid components at the front and the back, the rigidity of these cases is enhanced. This improves the quality of shock resistance and minimizes any damage if the equipment should be dropped.

(Cooling Mechanism)

The compact organization of projection-type display apparatus 1 effected for ease of transport necessarily reduces the amount of interior space, thus limiting the size of the passageways through which cooling air flows. Further, although it is desirable to cover power supply unit 7 and other components with a shielding plate in order to reduce noise, covering them isolates the interior of power supply unit 7 from the other components. This could inhibit the flow of cooling air through the interior of power supply unit 7 and thus reduce cooking efficiency. Further, if the open air inlet for exterior case 2 is clogged, a sufficient amount of air cannot be introduced into the interior of the equipment, and may result in insufficient cooling.

To solve these problems and to provide a cooling mechanism that ensures efficient cooling of the components in the interior of the equipment, projection-type display apparatus 1 of the present embodiment adopts the constitution described below.

The cooling mechanism for projection-type display apparatus 1 of the present embodiment also contains a cooling air inlet 28 formed on equipment exterior case 2; a suction fan 15 that introduces air into the interior of the case; an air exhaust outlet formed on equipment exterior case 2 for discharging the air introduced into the interior of the case to the outside; and an exhaust fan 16 that discharges the interior air to the outside through the air exhaust outlet.

In the present embodiment, lamp housing 802 for light source lamp unit 8, which is a heat source, is designed in the following shape: an air vent for introducing the cooling air is formed on the front side in the direction of the optical axis; an exhaust outlet is formed on the backside in the direction of the optical axis; and the horizontal and vertical peripheries are substantially closed. The lamp housing is arranged in such a way that the suction side of said exhaust fan 16 is positioned at the back of said exhaust outlet that is formed on lamp housing 802.

In this way, at least part of the air flow that is introduced into the interior of the equipment from said suction fan 15 flows into the interior of the equipment along the optical axis from the side of said air vent at the front side of said lamp housing 802. The air then passes around light source lamp 801 placed inside said lamp housing 802, is drawn to the side of said exhaust fan 16 from said exhaust outlet formed on the rear side, and discharged to the outside. Thus, the flow of the cooling air into lamp housing 802 in the direction of the optical axis and along the periphery of the lamp housing ensures the efficient cooking of interior components such as lamp 805 and reflector 806.

In the present embodiment power supply unit 7, which is a heat source, adopts the structure wherein an auxiliary suction fan 17 for forcing cooling air into the interior of the power supply unit and an exhaust outlet that discharges the air introduced into the unit by auxiliary suction fan 17 are attached.

In this manner at least part of the air flow that is introduced into the interior of the equipment from said suction fan 15 is forced into the interior of said power supply unit 7 by said auxiliary suction fan 17. The air is then drawn to the side of said exhaust fan 16 through the interior of the unit and said exhaust outlet and discharged to the outside. Thus, even if power supply unit 7 is a closed space covered by shielding case 701 and other components, a sufficient amount of air is permitted to flow into the interior of the equipment, and the equipment is adequately cooled.

Further, in the present embodiment, said air inlet 28 is formed on the bottom wall of said exterior case 2, and said suction fan 15 is provided directly above the air inlet in order to create a cooling air flow in the upward direction. Also, a second suction inlet 24 is formed on the upper wall of exterior case 2 at a position corresponding to said suction fan 15. Said optical lens unit 9 is positioned between the second suction inlet 24 and said suction fan 15. An air-flow path is created in said optical lens unit 9. The air-flow path directs the air introduced from said second suction inlet 24 to the suction side of said suction fan 15, and guides the air blown from said suction fan 15 to the side of said second suction inlet 24.

Thus, even if the suction inlet 28 on the suction side of suction fan 15 is clogged, because the second suction inlet 24 is formed so that the air introduced from there is directed to the side of suction fan 15, a sufficient amount of air can be introduced from the second suction inlet 28. This ensures that the interior of the equipment is cooled sufficiently at all times.

In this case it is desirable to cover the periphery of the aforementioned suction fan with sealing plate 1150 in order to partition the system and form an air path that directs the air that has descended through the aforementioned air-flow path for the aforementioned optical lens unit to the suction side of said suction fan 17.

The following describes the specific cooking mechanism for the heat-generating components in projection-type display apparatus 1 of the present embodiment with reference to FIGS. 7, 8, 9, and 10.

Figure 8:
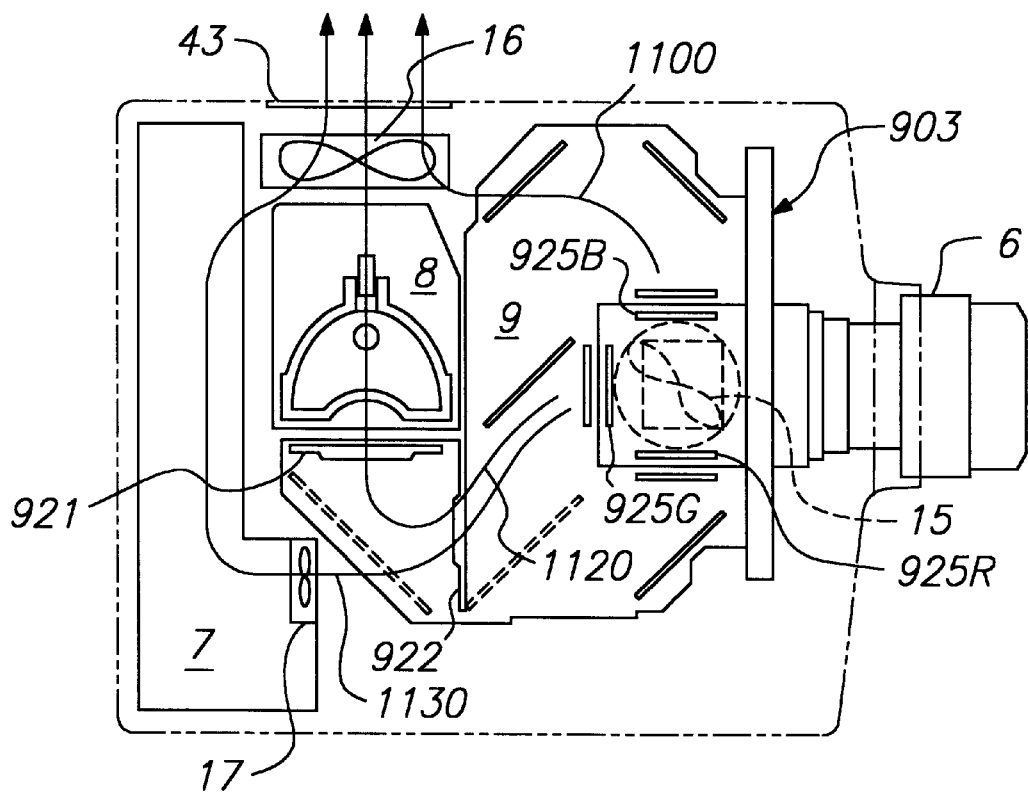
FIG. 8 explains the planar flow of cooling air.

The basic flow of cooling air in apparatus 1 of the present embodiment, on a plane, takes the path shown in FIG. 8. The air drawn, by cooling suction fan 15 from the outside through air vent 28 that is formed on bottom wall 4a of apparatus 1, passes through the interior of optical lens unit 9 and is discharged to the outside by exhaust fan 16 that is provided on the left side surface of the equipment. As indicated by the bold lines in FIG. 8, the principal air flow is as follows: part of air flow 1100, on a plane, passes through optical lens unit 9, reaches exhaust fan 16 in a straight line, and is discharged to the outside after passing through the exhaust fan.

Another air flow 1120 enters into the interior of the equipment from optical lens unit 9 and from the front side of light source lamp unit 8 through air vent 804a formed on outer housing 804 and through air vent 808 formed on inner housing 803. After passing through this area, the air passes through exhaust outlet 807 on the rear side and is discharged to the outside through exhaust fan 16 located on the back side.

On the other hand, another air flow 1130 is drawn in by auxiliary suction fan 17 attached to the edge of power supply unit 7 and pulled through to the interior of power supply unit 7. After passing through the interior of the power supply unit, the air is suctioned by exhaust fan 16 from the other edge and discharged to the outside.

Figure 9:
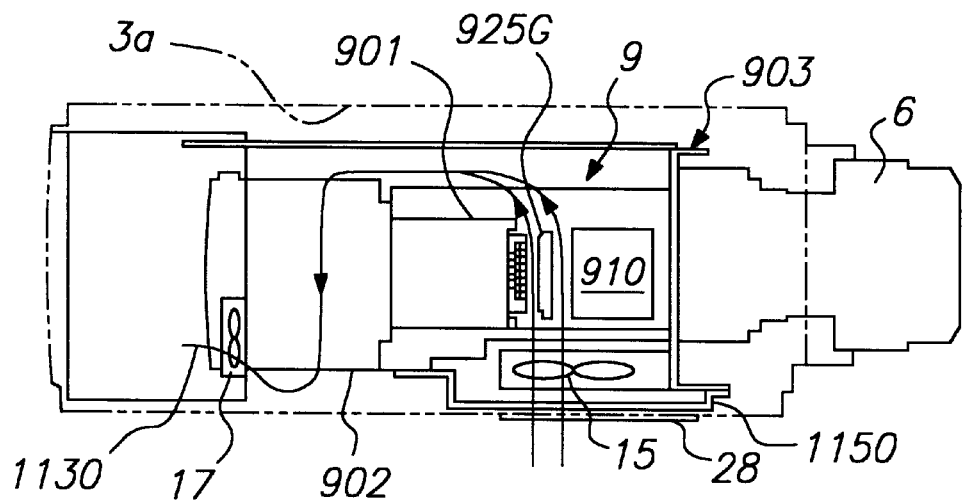
FIG. 9 explains the 3D flow of cooling air.

FIG. 9 shows the three-dimensional flow of air flow 1130 through the flow path, passing through the interior of power supply unit 7. As shown in the figure, after being drawn from the outside by suction fan 15, air flow 1130 is blown upwards along the incident and emission side surfaces of light valves 925R, G, and B of optical lens unit 9; it passes through the vent hole that is opened in upper light guide 901, enters into the space between the upper surface and the backside of upper wail 3a of the upper case, and flows in the horizontal direction through the space between these units. Then, the air passes through the vent hole opened in upper light guide 901, descends through the components of optical lens unit 9 in which integrator lenses 921 and 922, which are uniform-illumination optical devices, are provided, enters into the lower side of the vent hole that is opened in lower light guide 902, and then is introduced into the interior of power supply unit 7 through exhaust fan 17. After that, the air flows to the side of exhaust fan 16, from which it is discharged to the outside.

As described above, in this embodiment an auxiliary suction fan 17 is provided in order to force the introduction of a cooling air flow into the interior of power supply unit 7. This effectively cools the interior of power supply unit 7, which is a heat source.

FIG. 7 shows the three-dimensional flow of air flow 1120 that flows and passes through light source lamp unit 8. As shown in the figure, air flow 1120 flows along the space between upper light guide 90 1 and the back side of upper case upper wall 3a and reaches the upper front edge on the emission side of light source lamp unit 8. From there, the air flow flows along the surfaces of the constituent components of light source lamp unit 8 and reaches exhaust fan 16 on the back side. Thus, air flow 1120 flows along the inner and outer surfaces of outer housing 804 and along the inner and outer surfaces of inner housing 803. Further, it flows along the surface of reflector 806.

As indicated above, in this embodiment air flow 1120 is formed along the optical axis from the front edge to the back side of light source lamp unit 8, thus efficiently cooling the areas around heat sources such as lamp 805 and reflector 806.

Figure 10:
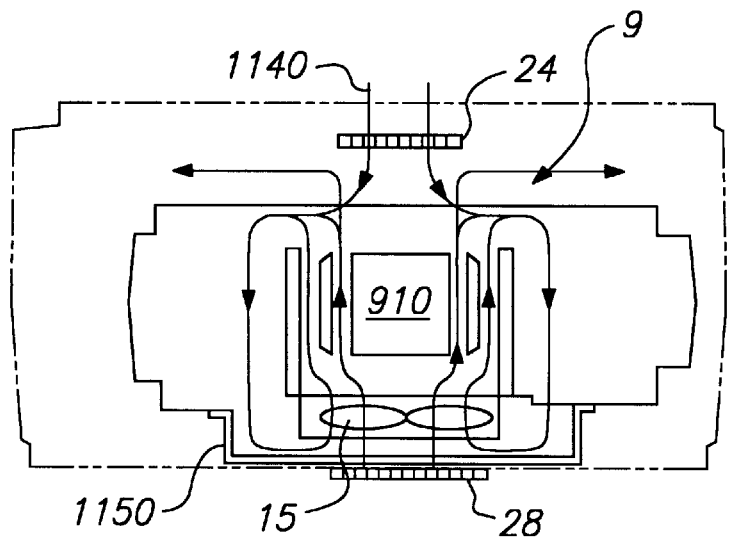
FIG. 10 explains the 3D flow of cooling air.

As indicated in FIGS. 9 and 10, in this embodiment vent hole 24 is formed on the side of upper wall 3a of the upper case. Consequently, even if filter 29, attached to vent hole 28 of suction fan 15, should become clogged and a sufficient amount of air cannot be introduced through the filter, air can still be introduced from upper-side vent hole 24 as follows: as shown in FIG. 10, if lower vent hole 28 is clogged, negative pressure prevails in the interior. This causes the air to be introduced from the upper vent hole 24 and creates the air flow shown by bold line 1140. This air flow 1140 is introduced from vent hole 24 and drawn to suction fan 15, by which it is again blown upwards. Some of this air flow becomes a circulation flow and circulates through suction fan 15. (Needless to say, such a circulation flow also occurs under normal circumstances even if the lower vent hole 28 is not clogged.) The remaining air flow flows and passes through various components as air flows 1110 1120, and 1130, and is discharged to the outside from exhaust fan 16.

A sealing plate 1150 is attached to the area around suction fan 15 to ensure the efficient introduction of air from the upper vent hole 24 in the event of the clogging of the lower vent hole 28. Air vents are provided on sealing plate 1150, at the position corresponding to communication hole 24. The periphery of the sealing plate is bonded to the back sides of lower light guide 902 and the bottom wall 92 of the head plate. This ensures the efficient formation of the circulation flow shown in FIG. 10. Thus, the external air is introduced efficiently from the upper-side communication hole 24.

Thus, the provision of communication hole 24 in this embodiment ensures that the interior of the equipment can be cooled without impedance even when the communication hole 28 for introducing external air on the side of suction fan 15 is clogged. The attachment of sealing plate 1150 ensures that external air can be introduced efficiently from vent hole 24, which is at a distance from suction fan 15, even when the hole is clogged.

(Light Valve Position Alignment Mechanism)

The following describes the position alignment mechanism for liquid crystal light valves 925R, G, and B of the present embodiment with reference to FIGS. 4A and 5. Since the position alignment mechanisms for these three light valves are identical, it suffices to describe the position alignment mechanism of one light valve, 925R.

Light valve block 1200, to which light valve 925R is attached, is fixed to the upper surface of bottom wall 92 of head plate 903. The light valve block 1200 contains lower adjustment plate 1210, which is attached to bottom wall 92. A right-and-left pair of long holes 1211 and 1212 are formed on the lower adjustment plate 1210. These holes form an elongated shape in the direction of the light path. Through these holes the adjustment plate is fixed to the bottom wall 92 of the head plate by means of locking screws 1213 and 1214.

A focus adjustment plate 1220 is attached to the top surface of the lower adjustment plate 1210 in such a way that the focus adjustment plate is perpendicular to the light path. Focus adjustment plate 1220 is provided with a vertical wall 1221, a bottom wall 1222 that extends horizontally from the lower edge to the upstream of the light path, and a top wall 1223 that extends horizontally from the top edge to the downstream of the light path. A joggle 1224 is formed at the center of bottom wall 1222. The joggle is supported in a rotatable manner by lower adjustment plate 1210. Therefore, focus adjustment plate 1220 can be rotated to the right and left around the vertical line that passes through joggle 1224. Bottom wall 1222 is fixed to the side of lower adjustment plate 1210 by a pair of locking screws 1225. On the other hand, the upper wall 1223 of focusing plate 1220 is fixed to cover 910a that covers the top surface of prism unit 910 by means of locking screws 1226. The screw holes 1227 of screws 1226 are set so that they are larger than screws 1226. Therefore, by loosening screw 1226, one can move the position of focus adjustment plate 1220 back and forth or to the right and left to some extent. A notch 1228 is formed at the tip of upper wall 1223. Notches 910b are formed also at positions that are opposite notches 1228 at specified intervals. When focusing plate 1220 is attached, an insertion groove 1229, into which the blade of a slot screw driver can be inserted, between the notches. When the blade of a screw driver is inserted and turned into insertion groove 1229, the focus adjustment plate 1220 rotates, with respect to prism unit 910, around the vertical line centered on joggle 1224 and moves in the direction of the light path (in the back-and-forth direction).

Thus, a perpendicular adjustment plate 1230 is supported on the vertical wall 1221 of focusing plate 1220 that can be moved back and forth in the direction of the light path, such that the perpendicular adjustment plate is parallel to the vertical wall. In other words, perpendicular adjustment plate supporters are formed at the top and bottom of vertical wall 1221. Perpendicular adjustment plate 1230 is held between these supporters. The lower edge of perpendicular adjustment plate 1230 is supported on the lower edge side of focusing plate 1220 through alignment spring 1231. The top edge is pressed downward by the pair of right and left alignment adjustment screws 1232 and 1233 that are attached to focusing plate 1220. Consequently, by adjusting the amount of screw turns on the pair of adjustment screws 1232 and 1233, one can move perpendicular adjustment plate 1230 up and down relative to focusing plate 1220.

A horizontal adjustment plate 1240, parallel to the perpendicular adjustment plate, is supported on perpendicular adjustment plate 1230. Horizontal adjustment plate 1240 is pressed by an alignment adjustment spring 1241 on either of its right or left sides. The other side is pressed by one alignment adjustment screw 1242. Therefore, by adjusting the amount of screw turns on screw 1242, one can laterally move horizontal adjustment plate 1240 relative to perpendicular adjustment plate 1230. Light valve unit 1250, to which liquid crystal light valve 925R is attached, is fixed at the center of horizontal adjustment plate 1240.

After filing light valve block 1200 of this constitution to head plate bottom wall 92, one can adjust lower adjustment plate 1210 back and forth in the direction of the light path and rotate focusing plate 1220 around the vertical line centered on joggle 1224. In this manner, one can easily determine the focusing position for light valve 925R, i.e., its position in the direction of the light path. Also, by moving perpendicular adjustment plate 1230 and horizontal adjustment plate 1240 up and down and right and left, one can adjust the alignment of light valve 925R.

In light valve block 1200 of the present embodiment, the three plates, focus adjustment plate 1220, perpendicular adjustment plate 1230, and horizontal adjustment plate 1240, are fixed by U-shaped adjustment plate locking screws 1260 at three locations: the right center, the left center, and the center at the top edge. In contrast to the conventional case where these three plates are fixed by locking screws, this embodiment eliminates the need for loosening the locking screws for focusing purposes. Thus, the present embodiment offers the advantage in that one can adjust the equipment with locking spring 1260 attached. In the conventional case, fixing the three plates by fastening the locking screws after positioning the adjustment plates can cause the three plates to shift. The present embodiment, however, eliminates the necessity for such an operation. Therefore, there is no possibility of the three plates moving out of alignment after they are adjusted.

In order to ensure the complete integration of the three plates in this embodiment after position alignment, a bonding agent receptacle 1270 is provided at the top edge of the three plates. After the three plates are positionally aligned, one fills the bonding agent receptacle 1270 in order to fix the plates by means of an adhesive.

(Structure of the Height Adjustment Feet)

Figure 14:
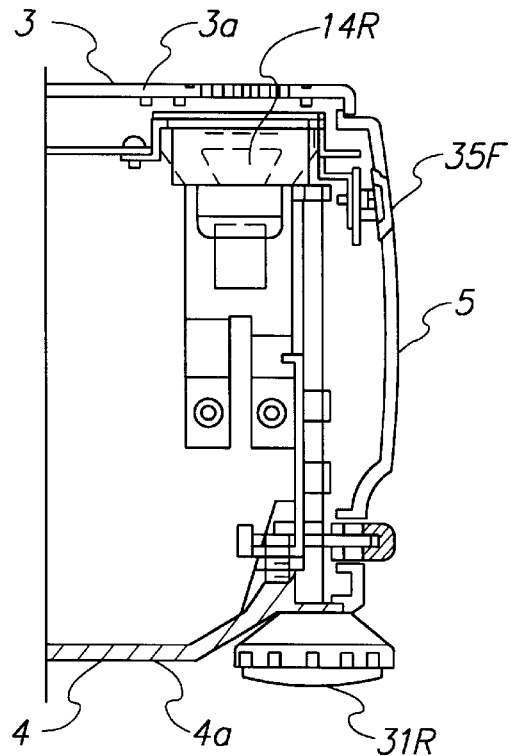
FIG. 14 is a partial cross-sectional diagram showing the structure of the height adjustment foot.
Figure 15:
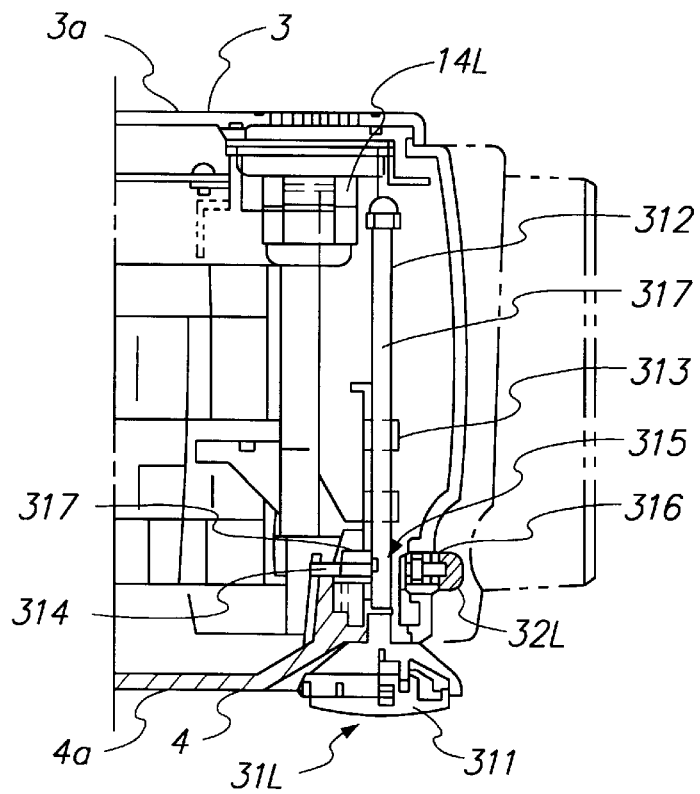
FIG. 15 is a partial cross-sectional diagram showing the structure of the height adjustment foot.

FIGS. 14 and 15 show height adjustment feet 31R and 31L, respectively. Because these feet have an identical shape and contain the same height adjustment mechanism, the following only describes one of them, foot 31L. Foot 31L contains a disc-shaped foot 3111, which exposes from the lower edge of front case 5 of the equipment; and a shaft 312, which extends from the top edge in a coaxial manner. Shaft 312 is supported in a vertical movable state by foot adjuster plate 313 which is fixed and supported by lower case 4. A male screw 317 is formed for almost the entire length of the shaft in the outer circumference of the shaft.

A plate-shaped foot stopper 314 is formed in an integrated manner on the backside of foot stopper button 32L that exposes forward from the lower edge of front case 5. A through hole 315, through which aforementioned shaft 312 penetrates, is formed in foot stopper 314. Further, foot stopper 314 is constantly pressed toward the front of the equipment by foot stopper spring 316. Therefore, button 32L on the front side of foot stopper 314 is maintained in a state in which it protrudes forward from front case 5. In this state, part of the inner circumference of through hole 3 15 of foot stopper 314 is pressed against the outer circumference of shaft 312 at a specified pressure. A female screw 318, which matches male screw 317 of the shaft, is formed on the inner circumference of the through hole.

The height adjustment foot 31L of this constitution is prevented by spring 316 from moving in the vertical direction. However, pressing button 32L in against the force of the spring dislodges foot stopper 314 from shaft 312. This enables foot 31L to move freely up and down along foot adjuster plate 313. Therefore, when one lifts the equipment with both hands and presses the right and left buttons, 32L and R, feet 31L and 31R will fall of their own accord. In this way, one can pull out the feet to a specified length. After that, one can fix the feet at the desired position by releasing buttons 32L and R with the feet pulled out to a specified length.

After that, rotating the feet causes shaft 312 to move vertically in small increments along screw 318 on the side of stopper 314. Therefore, after performing gross adjustments to the length of feet 31L and R by pressing buttons 32L and R, one can rotate the feet in order to perform microadjustments. Thus, in this embodiment, one can simply and quickly adjust the front-edge height of apparatus 1 and set apparatus 1 at the desired angle of inclination.

(Control Wheel Attachment Structure)

The following describes the attachment structure for control wheel 38 with reference to FIGS. 17A and 17B.

Control wheel 38 is housed in wheel-housing recess 3e formed on the side of apparatus 1. Control wheel 38 rotates around the pair of lower edges 38a and 38b and can be pulled out laterally. In this embodiment, the bearing for control wheel rotary axis 381 is formed by combining upper case side wall 3b and lower case side wall 4b. A slightly protruding process 383 is formed on the circumference of lower edges 38a and 38b of the control wheel. By process 383, control wheel 38 is fixed with a prescribed restraining force at the housing position indicated by the solid line in FIG. 17A and at the withdrawing position indicated by the imaginary line.

(Control System)

Figure 25:
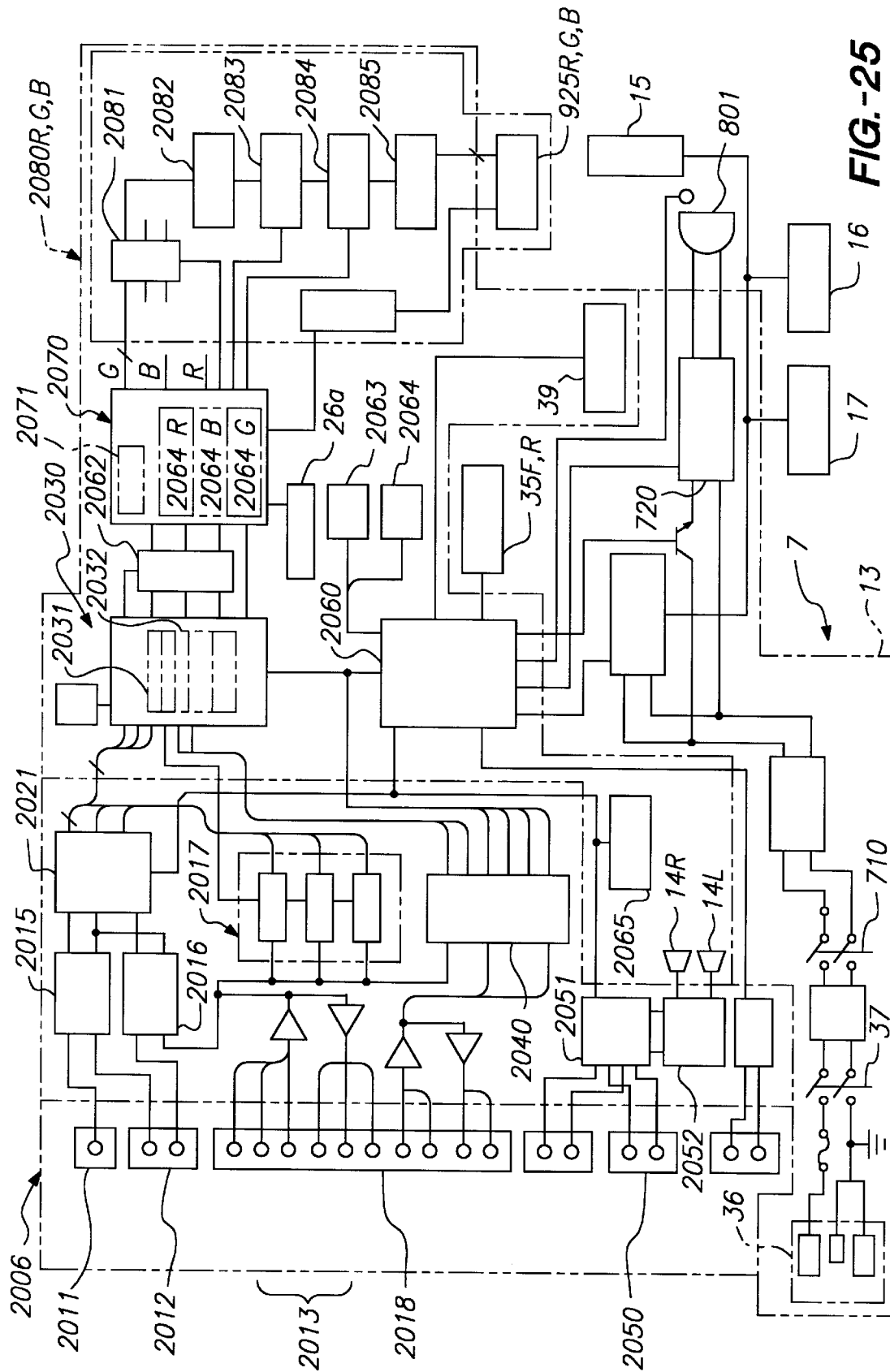
FIG. 25 is a schematic block diagram of the control system for the projection-type display apparatus of the present embodiment.

FIG. 25 shows a schematic block diagram of the control system for projection-type display apparatus 1 of the present embodiment. As shown in the figure, video signals are input from the outside through the interface circuits that are formed on interface circuit board 11. The video signals received from video input terminal 2011, which is an ordinary video signal input terminal; input terminal 2012 for S-video signals; and input terminal 2013 for computer output signals R, G, and B, are AD-converted by AD converters 2015, 2016, and 2017, respectively. After being AD-converted, the input video signals from video input terminals 2011 and 2012 are decoded by digital decoder 2012 and supplied to control block 2030, on which VRAM controller 2031 is mounted.

Digital decoder 2021 converts video signals into 8-bit video signals of R, G, B each and outputs the converted video signals to VRAM controller 2030. The digital decoder also outputs information on the signal format of the input video signals to micro controller 2060.

The R, G, B video input signals, after being AD-converted, are supplied to VRAM controller 2031. The vertical synchronization signal V and the horizontal synchronization signal H are supplied to synchronization signal-processing circuit 2040. Voice information is input from input terminal 2050 through volume 2051 and supplied to right and left speakers 14R and 14L through amplifier 2052.

Micro controller 2060 provides overall controls for the system; it determines whether or not the input video signals are computer input signals, based upon the signals from the synchronization signal-processing circuit and upon PC mode 2032 that is set in control block 2030. The micro controller 2060 also determines the format of input video signals based on test signal 202 is that is supplied by digital decoder 2021 and controls the write operation on VRAM 2062 by VRAM controller 2031. The micro controller 2060 also controls the write operations that are performed on liquid crystal light valves 925R, G, and B.

VRAM 2062 stores in memory the video signals expanded by VRAM controller 2031.

Gamma correction circuit 2071, mounted on control block 2070, reads digital gamma correction values from flash memory 2063 according to the format of the input video signals that are supplied by micro controller 2060 through bus interface 2033, and performs digital gamma correction on video signals. For each signal format, digital gamma conversion data is stored in flash memory 2063.

After being digital gamma-corrected, video information on colors R, G, and B is supplied, respectively, to drive circuits 2080R, G, and B for liquid crystal light valves 925R, 925G, and 925B. In each drive circuit, digital video signals are converted into analog signals through DA converter 2081, amplified by amplification/analog gamma correction circuit 2082, and selectively receive analog gamma correction. In the next step, analog video signals are superimposed on the alternating drive voltage in alternating voltage superimposition circuit 2083, and converted into the alternating drive voltage form for driving LCD. The result, when input into sample holder 2084, generates a 6-phase LCD drive voltage which is applied to the space between electrodes in the liquid crystal light valves through buffer 2085. This drives the pixel electrodes in the liquid crystal according to a given set of video signals.

It should be noted that SRAM 2064 is a work memory area, whereas EEPROM 2065 is memory that stores and retains adjustment data, such as user specified color brightness.

(Method for Driving Liquid Crystal Light Valves)

The liquid crystal light valves 925R, 925G, and 925B used in the present embodiment are matrix-type display panels with an identical structure. These structures are shown in laid-open Japanese patent application S62-145218 and S62-254124. In these disclosed structures, there are a plurality of pixels arranged in a matrix. Each pixel is activated by applying video signals of horizontal scanning line thereto.

Generally, it should be noted that these liquid crystal display panels have to be driven by alternating current and transmissivity of liquid crystal changes with the polarity of the applied voltage. This can cause undesirable results such as flickering. FIG. 28 shows how to avoid it in the conventional art such as that disclosed in S62-254124. According to this conventional way, each pixel of two liquid crystal light valves for R & B are driven in the same order of changing polarity +,-,+, . . . and a pixel of one remaining liquid crystal light valve for G is driven in reversed order of polarity -,+,-,+ . . . In this case, the starting pixel for scanning R and B light valve is the end of left side and that for G light valve is the end of right side. Thus this method smoothes out fluctuations and decrease flickering.

Furthermore, The arrows in this figure show the horizontal scanning direction for selecting each pixel in a given light valve. Namely, the scanning direction for R and B valve is from left to right and that for G is reversed because of handling optical reversal at dichroic prism as shown in FIG. 24. However, this conventional method has to require two different shift registers for three liquid crystal light valves. One is for R and B to scan a horizontal line from left to right and another is for G to scan a horizontal line from right to left.

In order to avoid such inconvenience, by contrast, the present invention employs the drive method described below to prevent any adverse effects due to fluctuations in transmissivity because of the polarity of alternating drive voltage even if the same shift register is used for all three liquid crystal light valves.

According to present embodiment, as shown in FIG. 25, line buffers 2064R and 2064B for primary storage of video signals R and B are provided. Video signal for pixels on one scanning line stored in these buffers is read in the order in which it is written and output to drive control circuits 2080R and 2080B(FIFO). On the other hand, line buffer 2064G primary storage of video signal G is read in such a way that video signal for a pixel was written last is read first (FILO), and such video signal is output to drive control circuits 2080G.

Figure 26:
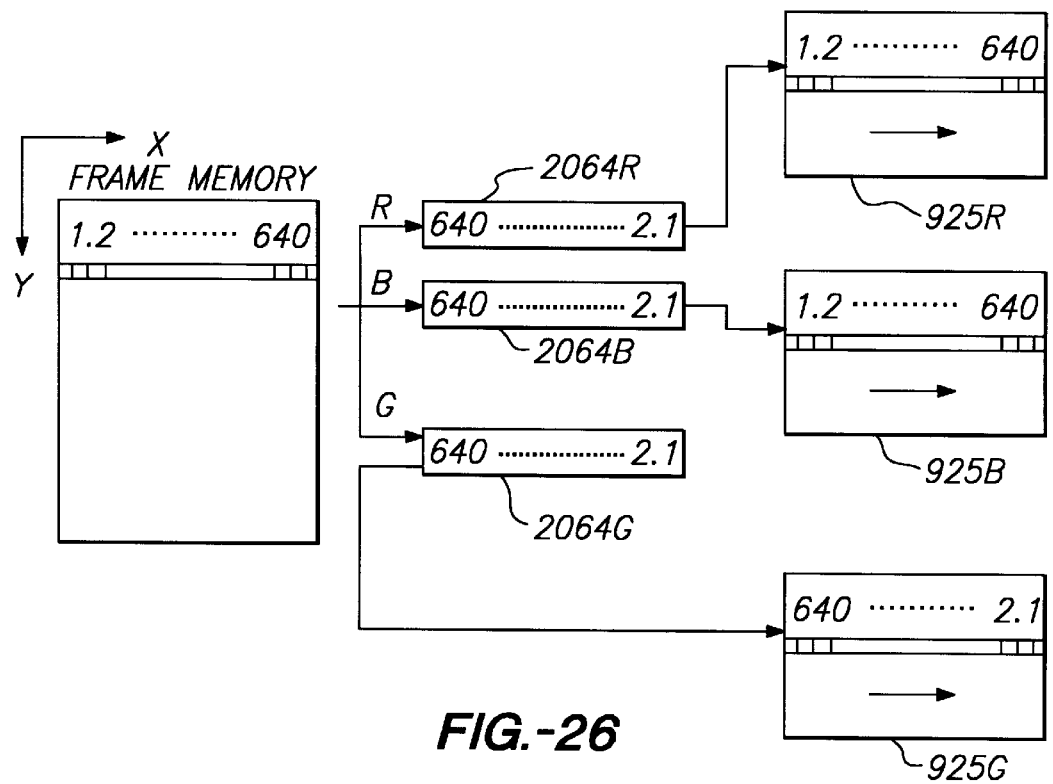
FIG. 26 explains how writing operations on the liquid crystal light valves for different colors are controlled in the preferred embodiment.

FIG. 26 shows the way how the present embodiment writes video signal for pixels within a scan line in light valves 925R, G, and B. The numbers, 1,2,3, . . . 640 indicates input video information for each pixel. Video signals for all pixels in one frame (or one field) are stored in a frame memory. Then, video signals for one scanning line from a frame memory are distributed into line buffers 2064R, 2064B and 2064G. Line buffer 2064R stores video signals of red color for one line, 2064B for blue and 2064G for green. Then, video signals for pixels on one scanning line stored in these buffers are read in the order in which these are written and output to drive control circuits including a shift register in liquid crystal valves 925R and 925B. On the other hand, line buffer 2064G is read in such a way that video signal for a pixel 640 was written last is read first and output to drive control circuits in liquid crystal valves 925G. Thus, the scanning direction of one horizontal line for green color remains the same for red and blue but content of video signal is written with the right-to-left orientation reversed.

As shown in FIG. 24, of the light beams of various colors that have passed through liquid crystal light valves 925R, 925G, and 925B, green light beam G passes directly through prism unit 910 and reaches projection lens unit 6, whereas red light beam R and blue light beam B are reflected at the right angle by the X-shaped reflecting dichroic surface of prism unit 910 and reach lens 6.

Therefore, after passing through prism unit 910, red light beam R and blue light beam B that have passed through liquid crystal light valves 925R and 925B undergo a right-to-left reversal of their optical images with respect to the green light beam G that has passed through liquid crystal light valve 925G.

However, as noted above, according to present embodiment, video signals written into liquid crystal light valve 925G already undergo a right-to-left reversal by line buffer as shown in FIG. 26 comparing that written into light valve 925B and 925R. After passing through prism unit 910 color light image R, G, and B can be correctly oriented in the right to left direction in their optical images.

Thus, in the present embodiment, the problem of the reversal of optical image caused by passing light beams through prism unit 910 can be avoided by controlling the write operation on liquid crystal light valve 925G by means of the drive control means described above. Therefore, liquid crystal light valves having identical shift registers each other can be used for liquid crystal light valves 925R, 925G, and 925B.

Figure 27:
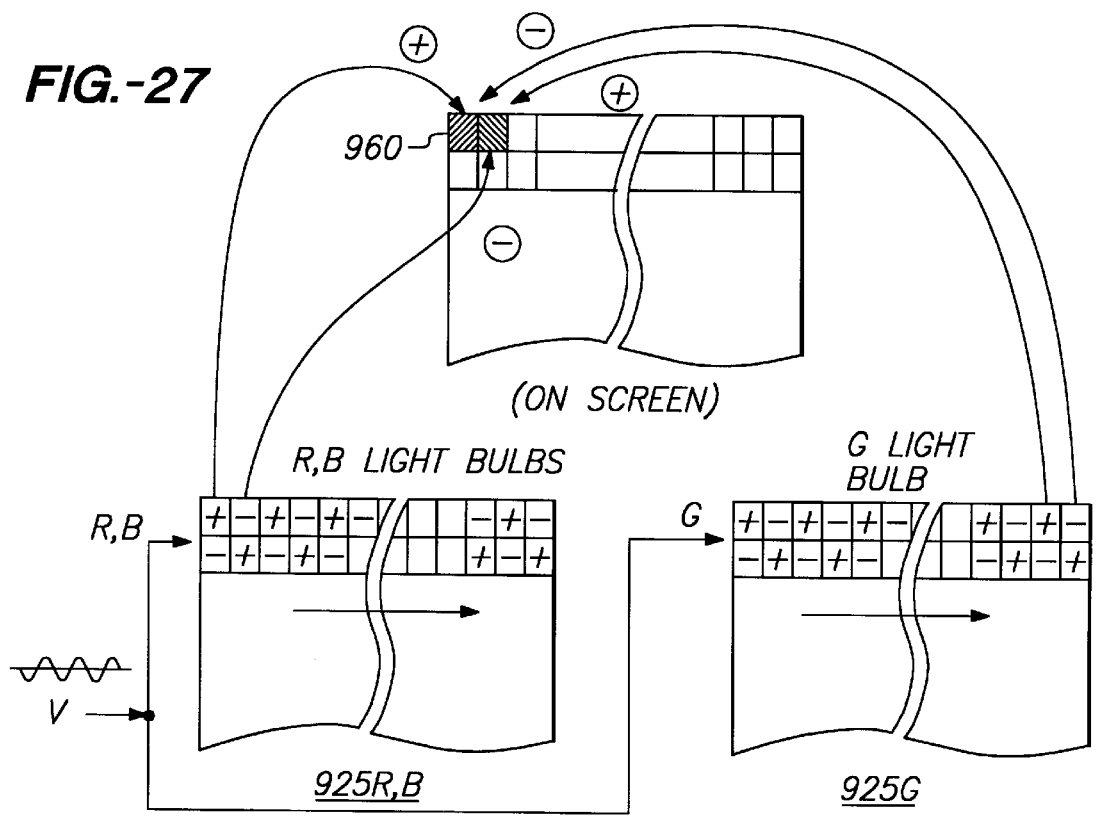
FIG. 27 shows the drive voltage polarities of pixels in the liquid crystal light valves for different colors.

Namely, common panels can be used for all three liquid crystal light valves and scanning direction for one horizontal line for these valves are the same. But the video signals which are written into liquid crystal light valve 925G is reversed in the right-to-left direction comparing with video signals train written into liquid crystal light valve 925R and B. In this case, the alternative drive voltages to drive these liquid crystal light valves are the same phase. As shown in FIG. 27, the light valves for R and B and the light valve for G are driven so that each pixel at the same position between two valves has the same polarity. Such polarity is changed in the same order such as +-+- between two valves. Further, scanning direction of video signal is the same such as left to right between two valves.

When the light valves are driven in this manner, the video image from 925G that is optically projected on screen 960 as shown in FIG. 27 are reversed and overlapped with images from 925R,B and these polarity for each pixel is reversed each other. For embodiment, negative pixel image from light valve 925G is projected and overlapped with positive pixel from light valves 925R and B on a screen 960. Therefore, by driving the liquid crystal light valves in this manner it is possible to decrease flickering caused by fluctuations in transmissivity due to changing polarity of the drive voltage.

In this regard, because the human eye is most sensitive to green, by reversing the polarity of the green color it is possible to reduce brightness differences efficiently between pixels.

(Method for Driving Liquid Crystal Light Valves for Data Compression)

According to the present embodiment, the operation of writing video signals to liquid crystal light valve 925R, G, and B is varied according to the input video signal systems.

When RGB signals came from a computer are entered into the projection system, the full-line driving is employed in the video mode in which the number of scanning lines toward vertical direction is greater than 200. In other words, as shown in FIG. 30A, a scanning line of video signals is made to correspond one-to-one to one line of write signals that are written to a row of a liquid crystal light valve. The number of rows toward vertical direction of liquid crystal light valves for effective displaying is 480. Therefore, in the video mode in which the number of display lines is less than 480, the non-display lines are processed as a black-level display.

Figure 30B:
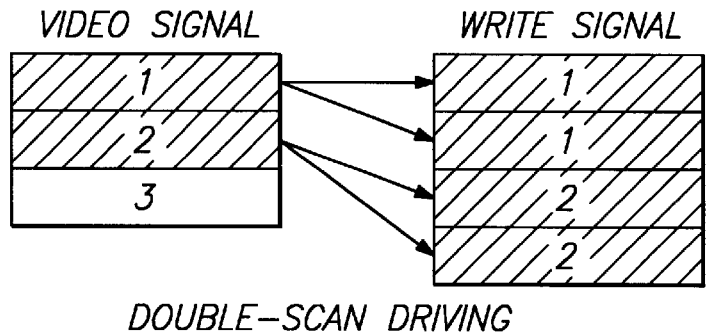

On the other hand, in the video mode in which the number of scanning lines is less than 200, the liquid crystal light valves are driven by the double-scanning drive method. In other words, as shown in FIG. 30B, each lime signal for video signal is written into pixels of two rows in a liquid crystal light valve.

In the case where input signals based on the NTSC system which is the TV broadcasting standard in Japan, one frame is composed of two odd-and-even fields, as is well known, such that the number of scanning lines per one frame is 525 and every one of scanning lines for odd field and even field is interlaced each other. But, the number of scanning lines for effective display in this 525 is approximately 480. So, liquid crystal light valves are driven by the half-line drive method in which one frame is composed only of one field of video signals. In addition, the way to form an image for each field is as follows.

Figure 31A:
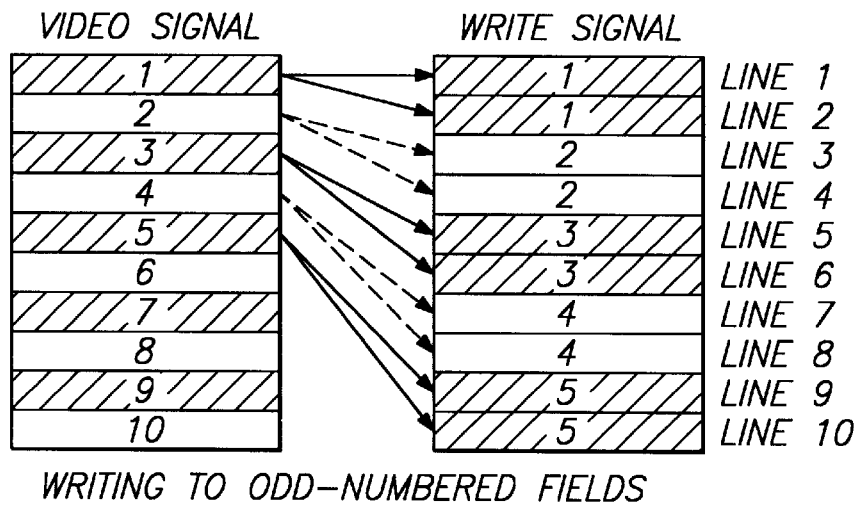
FIGS. 31A and 31B show how the process of writing NTSC-based video signals to a liquid crystal light valve is driven and controlled according to the preferred embodiment.

As shown in FIG. 31A for odd-numbered field, input video signals of the first scanning line 1 is written into rows 1 and 2 of a liquid crystal light valve by doublespeed conversion. Similarly, input video signals of each line is subsequently written to two adjacent rows of a liquid crystal light valve with double-speed conversion (the line-pair drive method).

Figure 31B:
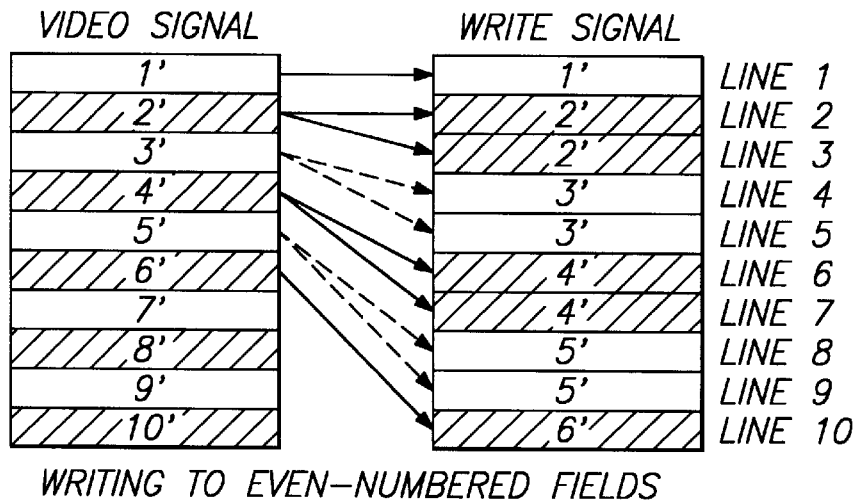

On the other hand, as shown in FIG. 31B for even-numbered field, input video signal of the first line 1' is directly written to one row 1 of a liquid crystal light valve. Input video signal of the second 2', third 3' and subsequent lines are written into two adjacent rows 2, 3, 4, and 5 of a liquid crystal light valve by double-speed conversion.

Figure 33:
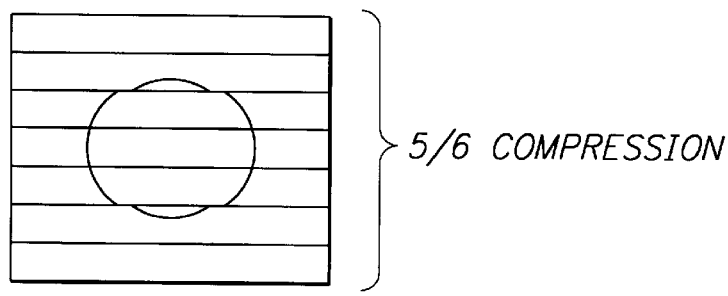
FIG. 33 shows an embodiment of the problems that result from conventional video data compression control.

On the other hand, in the case of video signals based on the PAL/SECAM system, the number of scanning lines per one frame is 625. Among 625 scanning lines, the number of effective lines for displaying is approximately 600. Conventionally, for displaying the video signals based on the PAL/SECAM system, which requires a greater number of scanning lines than the NTSC system, a specified number of video signal lines are culled on a liquid crystal panel so that the data is compressed by a factor of five-sixths and so that the effective number of display lines will fit within the 480-line limit. In this method, however, the compression processing causes dropouts of some video signal lines. As a result, for embodiment, as shown in FIG. 33, curved figures such as a true circle are rendered as discontinuous displays due to data compression.

In order to avoid above mentioned matter, the present embodiment employs the following the half-line drive method.

Figure 32A:
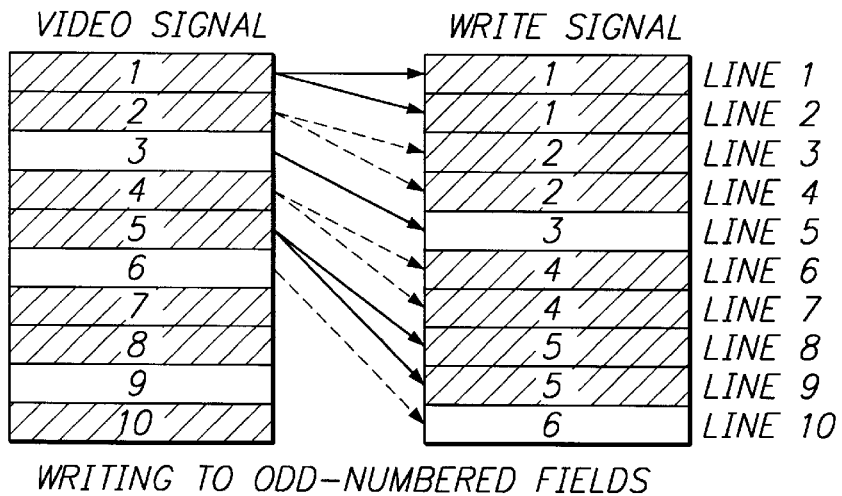
FIGS. 32A and 32B show how the process of writing PAL/SECAM-based video signals to a liquid crystal light valve is driven and controlled according to the preferred embodiment.
Figure 32B:
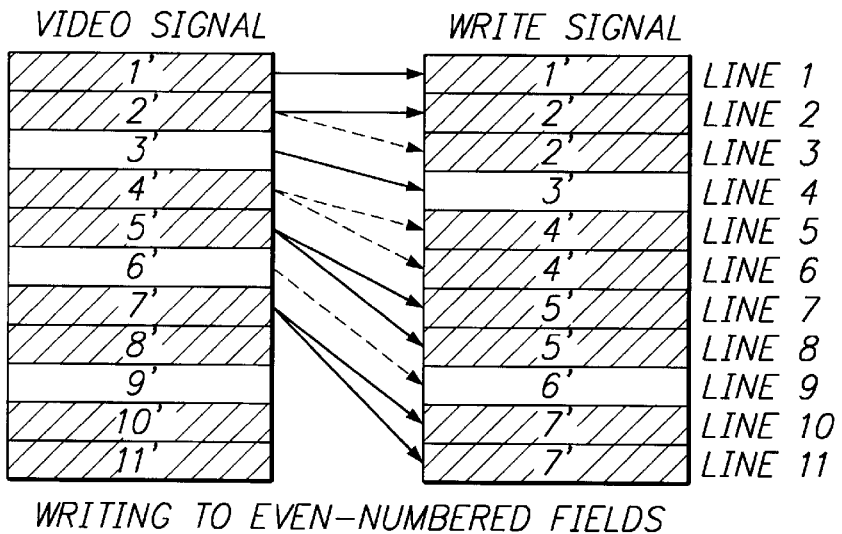

As shown in FIG. 32A, for odd-numbered fields, video signals of the first video line 1 are written into rows 1 and 2 of a liquid crystal light valve by double-speed conversion. Similarly, the second video line 2 is written into rows 3 and 4 of a crystal light valve by double-speed conversion. The next line, the third video line, however, is written only into the row 5 of a light valve. Subsequently, in a similar manner input video signals of three scanning lines are assigned and written into 2, 2, and 1 rows of the light valves (the modified line-pair drive method). On the other hand, for even-numbered fields, as shown in FIG. 32B, input video signal of the first line is written into one row of a light valve, input video signal of the second line is written into the rows 2 and 3 of the light valves by double-speed conversion, and the input video signal of the third line is written into only the row 4 of a light valve. Subsequently, input video signals of three lines are assigned and written to the rows 2, 2, and 1 of the light valves.

Thus, according to the present embodiment, when displaying video signals based on the PAL/SECAM system that requires a large number of scanning lines, input video signals of one of the three video lines is written only into one row of a light valve without double-speed conversion. As a result, compared to the situation in which each video line is double-speed converted and written to a light valve, as in the case of the NTSC system, the video signals that are written to a light valve are compressed by a factor of five-sixths. In the present embodiment, input video signals of three lines are assigned to 2, 2, and 1 lines of light valves. Alternatively, the order of such assignment can be either 2, 1, 2 or 1, 2, 2.

Consequently, the modified line pair drive method in the present embodiment does not produce any missing video lines as described in the conventional way and avoid the problem described above as shown in FIG. 33. Additionally, the modified line pair drive method does not require culling of video data for data compression purposes.

(Gamma Correction Method)

In the present embodiment, gamma correction using both digital and analog methods are applied to the video signals that are input into liquid crystal light valves 925R, G, and B. Specifically, in gamma correction circuit 2071 shown in FIG. 25, digital gamma correction is performed based upon the applied voltage-transmissivity (V-T) characteristics of liquid crystal light valves 925R, G, and B according to a conversion table for digital gamma correction values stored in flash memory 2063. In the next step, analog gamma corrections are applied to video signals of which applied voltage is located in a specific range of V-T curve, in amplification and analog gamma correction circuit 2082.

FIG. 29 shows the relationship between transmissivity of liquid crystal and applied voltage equivalent to level of video signal called as V-T curve (voltage vs. Light Transmissivity). Transmissivity from 0% to 100% is divided into 16 levels of gray scale such as level G1–G6. Voltage levels V1–V16 of video signal are corresponding to these gray scale level G1–G16. Voltage differences Vn and Vn+1 for each gray scale levels in the area B are substantially not changed. On the other hand, voltage differences V2 and V1 for each gray scale in the area A are sharply changed because of non linearity of the V-T curve. Namely, V1 is larger than V2 and V2 is larger than Vn even if the level difference of gray scale in the transmissivity is equal.

Under this circumstance, as an initial step, digital gamma correction is applied to all range of applied voltage. In this case, however, V2 and V3 need more numbers of bit allocation than that of Vn. Applying a digital gamma correction to the area A requires a large amount of bit allocation. For example, if digital gamma corrections for all range are performed with 256 bits, 100 bits, 40% of them have to be allocated to the area A, 20% of all levels of gray scale. But, if such large amount of bits are allocated only to that area, the rest of bits which should be allocated to other area should be reduced. On the other hand, this reduced bits allocation causes coarse correction to affect undesirable accuracy in the area A under gamma correction. In order to overcome such problems, in the present embodiment, the same amount of bits are allocated to all voltage differences from V1 to V16 under digital gamma correction. Then after such correction, V2 and V1 in the specific area A are corrected by the analog correction process. This analog correction is conducted by means of curve approximation as is known in the art. Consequently, the present embodiment achieves an accurate gamma correction overall first by applying a digital gamma correction and then by applying a second analog correction in specific cases. According to this embodiment, such analog gamma correction is added in the black area since sight sensitivity of human eyes is relatively sensitive in that area comparing with white area. But, there may be additional analog gamma correction even if in the white area, if it is necessary.

According to the present embodiment, a conversion table is additionally provided in flash memory 2063 for applying different digital gamma correction according to the different input video signal system such as NTSC or SECAM. Moreover, depending on the different input video signal system, the corresponding correction table can be automatically searched. This permits the application of consistently appropriate gamma corrections for different forms of input video signals. It should be noted that, instead of storing gamma correction values according to input video signals beforehand in memory, correction values can be calculated using arithmetic operation circuits.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A projection-type display apparatus having a light source, at least one liquid crystal light valve for modulating a light beam emitted by said light source based on input video signals, and a projection lens for enlarging and projecting said modulated light beam onto a screen, comprising:
   a digital gamma correction circuit for applying digital gamma correction to said input video signals based on a relationship between transmissivity of said at least one liquid crystal light valve and applied voltage to said at least one liquid crystal light valve to produce digitally corrected input video signals;
   and an analog gamma correction circuit for applying analog gamma correction to certain of said digitally corrected input video signals in a specific gray scale range where an applied voltage difference per unit level of gray scale is larger than that of other gray scale ranges.

2. A projection-type display apparatus claimed in claim 1, wherein said analog gamma correction is applied to said digitally corrected input video signals corresponding to a gray scale which is located in the range of low transmissivity.

3. A projection-type display apparatus claimed in claim 1, wherein said analog gamma correction is applied to said digitally corrected input video signals corresponding to a gray scale which is located in the range of high transmissivity.

4. A projection-type display apparatus claimed in claim 1, further comprising:
   recognition means for recognizing at least one type of input video signal format; and
   a write controller for controlling writing of said input video signals of each scanning line into pixels of a row in said at least one light valve based on a recognized type of input video signal format.

5. A projection-type display apparatus claimed in claim 4, wherein:
   said write controller receives input video signals based on the NTSC format and writes said input video signals of one line into pixels of two rows in said at least one liquid crystal light valve when video signals in one of odd and even fields are written into said at least one light valve; and further said write controller shifts said input video signals of one line in a vertical direction and writes said input video signals of another line into pixels of two rows in said at least one liquid crystal light valve when video signals in another of odd and even fields are written into said at least one light valve.

6. A projection-type display apparatus claimed in claim 4, wherein:
   said write controller receives input video signals based on PAL/SECAM format and writes said input video signals of each of two lines among three continuous scanning lines into pixels of two rows in said at least one liquid crystal light valve and the remaining one of the three lines into another row in said at least one liquid crystal light valve when video signals in one of odd and even fields are written into said at least one light valve; and
   said write controller shifts said input video signals of the first line in a vertical direction and writes said input video signals of each of two lines among another three continuous scanning lines into pixels of two rows in said at least one liquid crystal light valve and the remaining one of the three lines into another row in said at least one liquid crystal light valve when video signals in another of odd and even fields are written into said at least one light valve.

7. A projection-type display apparatus claimed in claim 6, wherein said write controller writes said input video signals of each of two lines among three continuous scanning lines into pixels of two rows in said at least one liquid crystal light valve with double speed conversion on each said even and odd field.

8. A method of operating a projection-type display apparatus having a light source, at least one liquid crystal light valve for modulating a light beam emitted by said light source based on input video signals, and a projection lens for enlarging and projecting said modulated light beam onto a screen, comprising the steps of:
   applying digital gamma correction to said input video signals based on a relationship between transmissivity of said at least one liquid crystal light valve and applied voltage to said at least one liquid crystal light valve to produce digitally corrected input video signals;
   and applying analog gamma correction to certain of said digitally corrected input video signals in a specific gray scale range where an applied voltage difference per unit level of gray scale is larger than that of other gray scale ranges.

9. A method as in claim 8, wherein said analog gamma correction is applied to said digitally corrected input video signals corresponding to a gray scale which is located in the range of low transmissivity.

10. A method as in claim 8, wherein said analog gamma correction is applied to said digitally corrected input video signals corresponding to a gray scale which is located in the range of high transmissivity.

11. A method as in claim 8, further comprising the steps of:

recognizing at least one type of input video signal format; and controlling writing of said input video signals of each scanning line into pixels of a row in said at least one light valve based on a recognized type of input video signal format.

12. A method as in claim 1, further comprising the steps of:

receiving input video signals based on the NTSC format and writing said input video signals of one line into pixels of two rows in said at least one liquid crystal light valve when video signals in one of odd and even fields are written into said at least one light valve; and further shifting said input video signals of one line in a vertical direction and writing said input video signals of another line into pixels of two rows in said at least one liquid crystal light valve when video signals in another of odd and even fields are written into said at least one light valve.

13. A method as in claim 11, further comprising the steps of:

receiving input video signals based on PAL/SECAM format and writing said input video signals of each of two lines among three continuous scanning lines into pixels of two rows in said at least one liquid crystal light valve and the remaining one of the three lines into another row in said at least one liquid crystal light valve when video signals in one of odd and even fields are written into said at least one light valve; and shifting said input video signals of the first line in a vertical direction and writing said input video signals of each of two lines among another three continuous scanning lines into pixels of two rows in said at least one liquid crystal light valve and the remaining one of the three lines into another row in said at least one liquid crystal light valve when video signals in another of odd and even fields are written into said at least one light valve.

14. A method as in claim 13, further comprising, writing said input video signals of each of two lines among three continuous scanning lines into pixels of two rows in said at least one liquid crystal light valve with double speed conversion on each said even and odd field.

* * * * *

UNITED STATES PATENT AND TRADEMARK OFFICE
CERTIFICATE OF CORRECTION

PATENT NO. : 5,905,540
DATED : May 18, 1999
INVENTOR(S) : Kiyoshi Miyashita, et al.

It is certified that an error appears in the above identified patent and that said Letters Patent is hereby corrected as shown below:

Column 31, line 9, change "claim 1" to --claim 11--.

Signed and Sealed this

Ninth Day of November, 1999

Q. TODD DICKINSON

*Attest:*

*Attesting Officer*   *Acting Commissioner of Patents and Trademarks*